United States Patent
Aoki et al.

(10) Patent No.: US 9,948,851 B2
(45) Date of Patent: Apr. 17, 2018

(54) IMAGING DEVICE AND FOCUSING CONTROL METHOD

(71) Applicant: FUJIFILM Corporation, Tokyo (JP)

(72) Inventors: Takashi Aoki, Saitama (JP); Yasuo Ohtsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/258,804

(22) Filed: Sep. 7, 2016

(65) Prior Publication Data

US 2016/0381284 A1 Dec. 29, 2016

Related U.S. Application Data

(63) Continuation of application No. PCT/JP2015/050877, filed on Jan. 15, 2015.

(30) Foreign Application Priority Data

Mar. 25, 2014 (JP) .................. 2014-062193

(51) Int. Cl.
*H04N 5/232* (2006.01)
*G02B 7/28* (2006.01)
(Continued)

(52) U.S. Cl.
CPC ........... *H04N 5/23212* (2013.01); *G02B 7/28* (2013.01); *G02B 7/34* (2013.01); *H04N 5/3696* (2013.01); *H04N 5/378* (2013.01); *H04N 9/045* (2013.01)

(58) Field of Classification Search
CPC .... H04N 5/23212; H04N 5/378; H04N 9/045; H04N 5/3696; G02B 7/34; G02B 7/28
See application file for complete search history.

(56) References Cited

U.S. PATENT DOCUMENTS

| | | | |
|---|---|---|---|
| 2010/0110272 A1* | 5/2010 | Sugawara | .............. H04N 5/367 348/341 |
| 2012/0229696 A1* | 9/2012 | Hashimoto | .............. G02B 7/36 348/360 |

(Continued)

FOREIGN PATENT DOCUMENTS

| | | |
|---|---|---|
| JP | 2006-133515 A | 5/2006 |
| JP | 2011-242652 A | 12/2011 |

(Continued)

OTHER PUBLICATIONS

English translation of International Preliminary Report on Patentability for PCT/JP2015/050877 (Form PCT/IPEA 409).
(Continued)

*Primary Examiner* — Timothy J Henn
(74) *Attorney, Agent, or Firm* — Birch, Stewart, Kolasch & Birch, LLP

(57) ABSTRACT

A phase difference AF processing unit (19) connects detection signals of phase difference detection pixels (52A) in an AF area (53), connects detection signals of phase difference detection pixels (52B) in the AF area (53), and performs a correlation operation with respect to detection signal groups after connection to generate a defocus amount when it is determined that a subject image formed in the AF area (53) includes a high frequency component. The phase difference AF processing unit (19) performs a correlation operation with respect to detection signal groups of phase difference detection pixels (52A, 52B) in each pair line in the AF area (53) to generate the defocus amount when it is determined that the subject image formed in the AF area (53) does not include a high frequency component.

20 Claims, 19 Drawing Sheets

(51) Int. Cl.
*G02B 7/34* (2006.01)
*H04N 5/369* (2011.01)
*H04N 5/378* (2011.01)
*H04N 9/04* (2006.01)

(56) References Cited

U.S. PATENT DOCUMENTS

| | | |
|---|---|---|
| 2013/0258168 A1 | 10/2013 | Aoki |
| 2014/0211059 A1 | 7/2014 | Aoki |
| 2016/0073008 A1* | 3/2016 | Masuyama ........ H04N 5/23212 348/349 |
| 2016/0198107 A1* | 7/2016 | Yamazaki ................ G02B 7/38 348/350 |
| 2016/0212323 A1* | 7/2016 | Ishii ................... H04N 5/23212 |
| 2016/0212325 A1* | 7/2016 | Kikuchi ................... G02B 7/28 |

FOREIGN PATENT DOCUMENTS

| | | | |
|---|---|---|---|
| JP | 2012-103285 A | 5/2012 | |
| JP | 2014032214 A * | 2/2014 | ............... G02B 7/34 |
| WO | WO 2012/073728 A1 | 6/2012 | |
| WO | WO 2013/047160 A1 | 4/2013 | |

OTHER PUBLICATIONS

International Preliminary Report on Patentability for PCT/JP2015/050877 (PCT/IPEA/409) with transmittal (PCT/IPEA/416) dated Dec. 28, 2015.
International Search Report for PCT/JP2015/050877(PCT/ISA/210) dated Mar. 17, 2015.
Written Opinion of the International Searching Authority for PCT/JP2015/050877(PCT/ISA/237) dated Mar. 17, 2015.

* cited by examiner

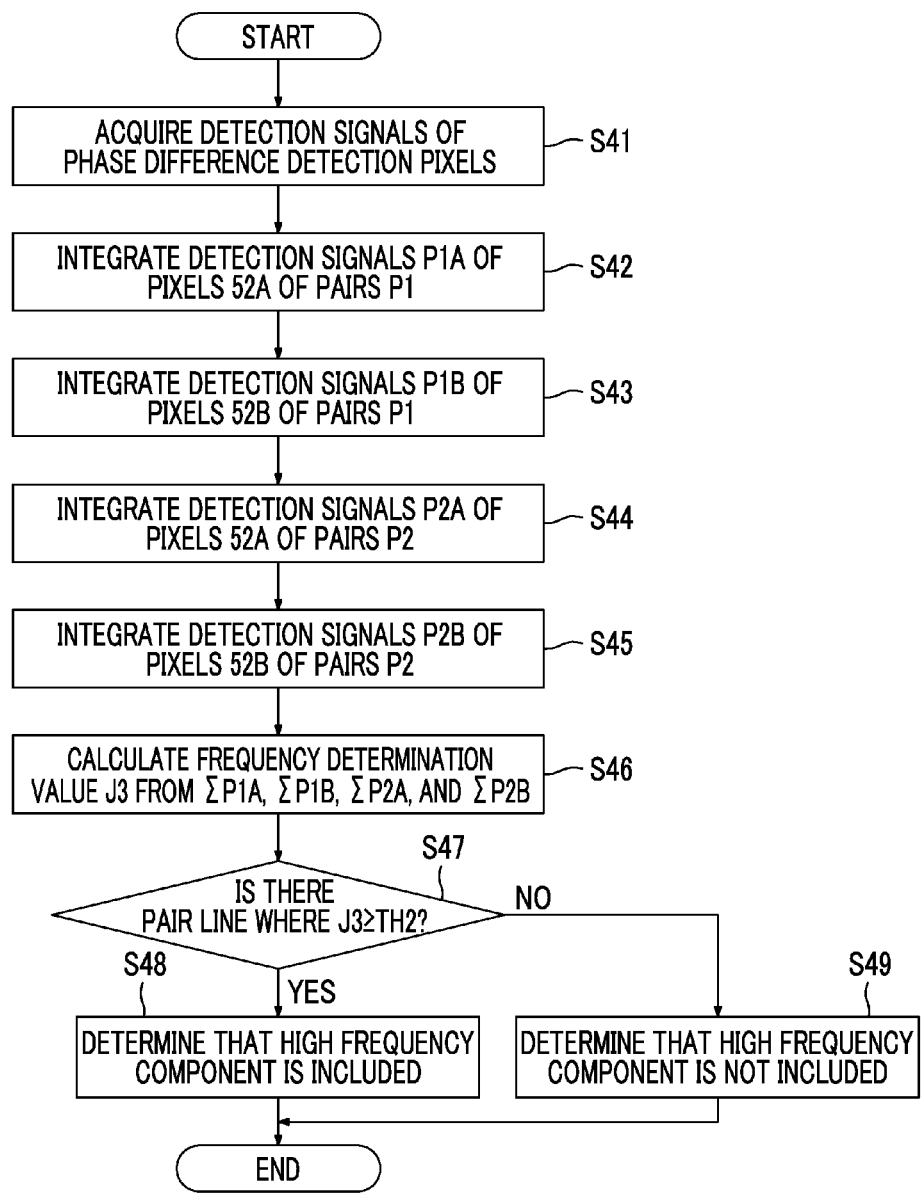

IMAGING DEVICE AND FOCUSING CONTROL METHOD

CROSS-REFERENCE TO RELATED APPLICATIONS

This application is a Continuation of PCT International Application No. PCT/JP2015/050877 filed on Jan. 15, 2015, which claims priority under 35 U.S.C § 119(a) to Japanese Patent Application No. 2014-062193 filed on Mar. 25, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a phase difference auto-focus (AF) method (for example, see JP2006-133515A, JP2012-103285A, JP2011-242652A, and WO2013/047160A) is employed.

In a solid-state imaging element mounted on an imaging device that performs a focusing control based on the phase difference AF method, for example, a configuration in which pairs of phase difference detection pixels in which light shielding film openings are eccentric in opposite directions are discretely arranged on an entire imaging surface is used.

Such a phase difference detection pixel has a low sensitivity compared with that of a normal imaging pixel in which a light shielding film opening is not eccentric with respect to a photoelectric conversion unit. Thus, in normal imaging, it is necessary to interpolate detection signals of phase difference detection pixels using detection signals of imaging pixels. Accordingly, if the number of phase difference detection pixels increases, the quality of a captured image deteriorates. On the other hand, if the number of phase difference detection pixels arranged in a direction where a phase difference is detected decreases, it is not possible to enhance the accuracy of detection of the phase difference according to subjects.

JP2006-133515A, JP2012-103285A, and JP2011-242652A disclose a method for connecting detection signals of phase difference detection pixels in plural rows arranged in a direction orthogonal to a phase difference detection direction to decrease a sampling interval of signals in the phase difference detection direction, in a dedicated distance measurement sensor.

WO2013/047160A discloses a method, in an imaging device comprising an imaging element that includes imaging pixels and phase difference detection pixels, for connecting detection signals of phase difference detection pixels which are arranged at different positions in a phase difference detection direction, in different rows, to decrease a sampling interval of signals in the phase difference detection direction.

SUMMARY OF THE INVENTION

As disclosed in JP2006-133515A, JP2012-103285A, JP2011-242652A, and WO2013/047160A, if the method of connecting the detection signals of phase difference detection pixels in plural rows is employed, it is possible to enhance the accuracy of detection of a phase difference while reducing the number of phase difference detection pixels in each row. However, in the case that the connection of the detection signals is performed with respect to phase difference detection pixels in different rows, there is a probability that an error will be included in a result of a correlation operation, and thus, it is not preferable to constantly perform the connection.

In JP2006-133515A, JP2012-103285A, and JP2011-242652A, the connection is performed in a case where it can be determined that images formed at two rows which are connection targets are approximately the same.

In WO2013/047160A, whether the connection is performed is determined according to whether an error of a detection signal group for each row due to a rolling shutter is severe or light.

That is, in the related art techniques, only when it can be assumed that approximately the same detection signals are acquired at two rows which are connection targets, the connection is performed.

However, there is a case where it is necessary to perform connection even when a matching degree of images formed at two rows which are connection targets is not high. Thus, it is not sufficient to achieve enhancement of accuracy of phase difference detection and enhancement of quality of captured images in parallel.

In order to solve the above-mentioned problems, an object of the invention is to provide an imaging device and a focusing control method capable of enhancing the quality of captured images and enhancing the accuracy of phase difference detection information for a focusing control.

According to an aspect of the invention, there is provided an imaging device comprising: an imaging element that includes an imaging surface where a plurality of signal detection units is arranged in two dimensions in a row direction and a column direction that is orthogonal to the row direction, the plurality of signal detection units including a first signal detection unit that detects a signal corresponding to a beam that passes through one divided region among divided regions of a pupil region of an imaging optical system divided in the row direction, a second signal detection unit that detects a signal corresponding to a beam that passes through the other divided region, and a third signal detection unit that detects a signal corresponding to beams that pass through the two divided regions, in which an area which is a focusing target on the imaging surface includes a block where a plurality of first signal detection unit groups including the plurality of first signal detection units arranged at a first pitch in the row direction and a plurality of second signal detection unit groups including the plurality of second signal detection units arranged at the first pitch in the row direction are respectively arranged in the column direction, in which positions of the respective first signal detection units that form the plurality of first signal detection unit groups in the row direction are different from each other, and positions of the respective second signal detection units that form the plurality of second signal detection unit groups in the row direction are different from each other, in which an arrangement pitch of the first signal detection units in a state where the respective first signal detection units that form the plurality of first signal detection unit groups are arranged in the order of positions in the row direction is a second pitch which is smaller than the first pitch, and in which an arrangement pitch of the second signal detection units in a state where the respective second signal detection units that form the plurality of second signal detection unit groups are arranged in the order of positions in the row direction is the second pitch. The imaging device further includes: a frequency determination unit that determines whether a subject image formed in the area includes a frequency component that is equal to or larger than a first threshold value; a defocus amount generation unit that performs a first generation process of generating a defocus amount based on a result of a correlation operation with respect to detection signals of the first signal detection unit group and detection signals of the second signal detection unit group in the block in a case where it is determined by the frequency determination unit that the subject image does not include the frequency component that is equal to or larger than the first threshold value, and performs a second generation process of generating a defocus amount based on a result of a correlation operation with respect to a detection signal group where detection signals of the first signal detection units that form the plurality of first signal detection unit groups are arranged in the order of positions in the row direction in the block and a detection signal group where detection signals of the second signal detection units that form the plurality of second signal detection unit groups are arranged in the order of positions in the row direction in the block in a case where it is determined by the frequency determination unit that the subject image includes the frequency component that is equal to or larger than the first threshold value; and a focusing control unit that performs a focusing control for the imaging optical system based on the defocus amount generated in the first generation process or the second generation process.

According to another aspect of the invention, there is provided a focusing control method in an imaging device including an imaging element that includes an imaging surface where a plurality of signal detection units is arranged in two dimensions in a row direction and a column direction that is orthogonal to the row direction, the plurality of signal detection units including a first signal detection unit that detects a signal corresponding to a beam that passes through one divided region among divided regions of a pupil region of an imaging optical system divided in the row direction, a second signal detection unit that detects a signal corresponding to a beam that passes through the other divided region, and a third signal detection unit that detects a signal corresponding to beams that pass through the two divided regions, in which an area which is a focusing target on the imaging surface includes a block where a plurality of first signal detection unit groups including the plurality of first signal detection units arranged at a first pitch in the row direction and a plurality of second signal detection unit groups including the plurality of second signal detection units arranged at the first pitch in the row direction are respectively arranged in the column direction, in which positions of the respective first signal detection units that form the plurality of first signal detection unit groups in the row direction are different from each other, and positions of the respective second signal detection units that form the plurality of second signal detection unit groups in the row direction are different from each other, in which an arrangement pitch of the first signal detection units in a state where the respective first signal detection units that form the plurality of first signal detection unit groups are arranged in the order of positions in the row direction is a second pitch which is smaller than the first pitch, and in which an arrangement pitch of the second signal detection units in a state where the respective second signal detection units that form the plurality of second signal detection unit groups are arranged in the order of positions in the row direction is the second pitch, the method comprising: a frequency determination step of determining whether a subject image formed in the area includes a frequency component that is equal to or larger than a first threshold value; a defocus amount generation step of performing a first generation process of generating a defocus amount based on a result of a correlation operation with respect to detection signals of the first signal detection unit group and detection signals of the second signal detection unit group in the block in a case where it is determined in the frequency determination step that the subject image does not include the frequency component that is equal to or larger than the first threshold value, and performing a second generation process of generating a defocus amount based on a result of a correlation operation with respect to a detection signal group where detection signals of the first signal detection units that form the plurality of first signal detection unit groups are arranged in the order of positions in the row direction in the block and a detection signal group where detection signals of the second signal detection units that form the plurality of second signal detection unit groups are arranged in the order of positions in the row direction in the block in a case where it is determined in the frequency determination step that the subject image includes the frequency component that is equal to or larger than the first threshold value; and a focusing control step of performing a focusing control for the imaging optical system based on the defocus amount generated in the first generation process or the second generation process.

According to the invention, it is possible to provide an imaging device and a focusing control method capable of enhancing quality of captured images and enhancing accuracy of phase difference detection for a focusing control.

BRIEF DESCRIPTION OF THE DRAWINGS

FIG. 12 is a flowchart illustrating a modification example of step S3 in FIG. 7.

DESCRIPTION OF THE PREFERRED EMBODIMENTS

Hereinafter, embodiments of the invention will be described with reference to the accompanying drawings.

Figure 1:
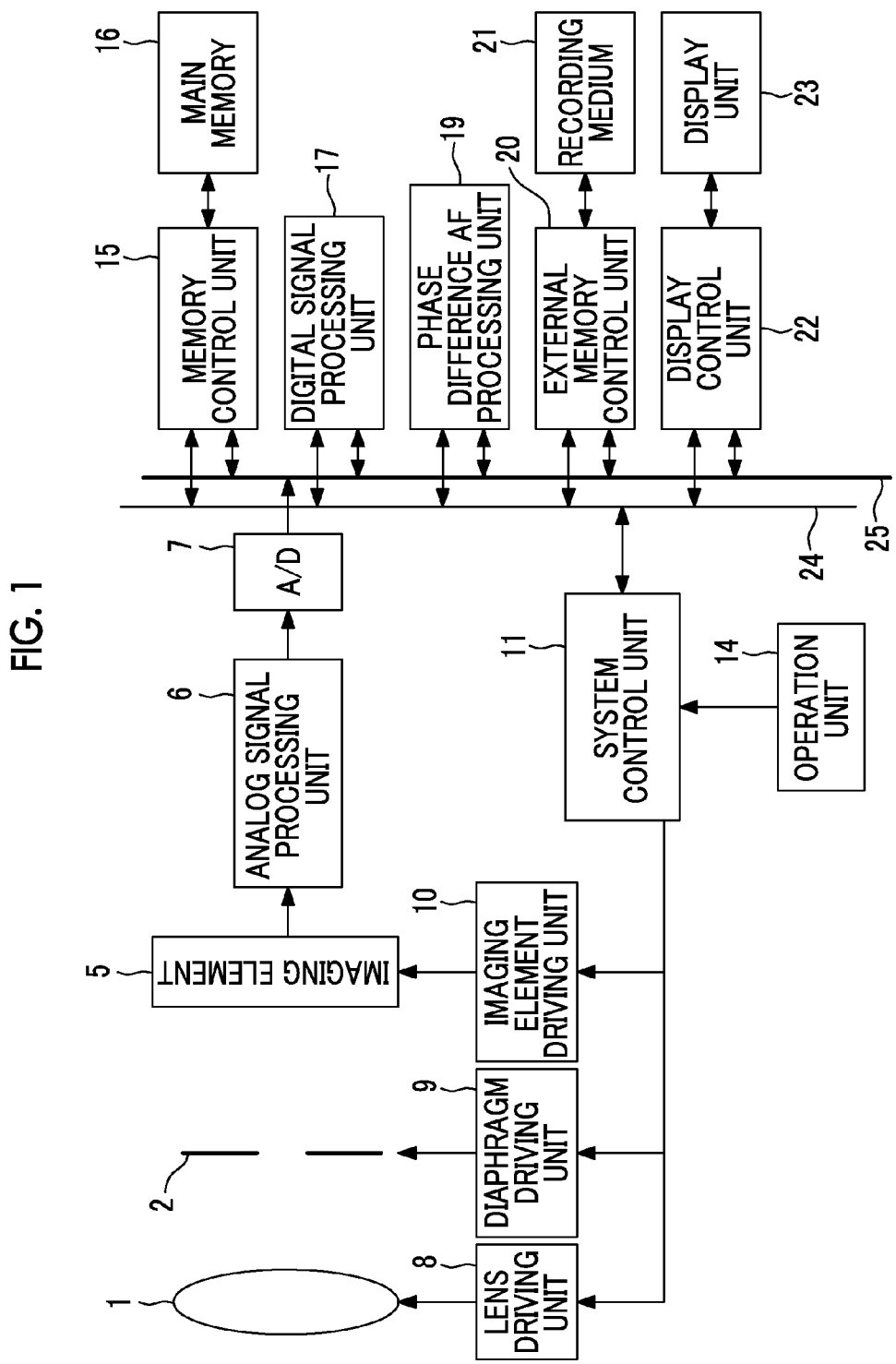
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system.

The lens device may be fixed to a camera main body, or may be exchanged with another lens device. The imaging lens 1 may include at least the focus lens. The focus lens may be a single focus lens that performs focus adjustment by moving the entirety of the lens system.

The digital camera includes an imaging element 5 of a CCD type, a CMOS type, or the like that images a subject through the lens device, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be provided in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 as a captured image signal. An instruction signal from a user is input to the system control unit 11 through an operation unit 14. The instruction signal includes an instruction signal for instructing execution of a focusing control of the imaging optical system.

Further, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, a phase difference AF processing unit 19, an external memory control unit 20 to which a detachable and attachably recording medium 21 is connected, and a display control unit 22 to which a display unit 23 mounted on a rear surface or the like of the camera is connected.

The memory control unit 15, the digital signal processing unit 17, the phase difference AF processing unit 19, the external memory control unit 20, and the display control unit 22 are connected to each other through a control bus 24 and a data bus 25, and are controlled by instructions from the system control unit 11.

Figure 2:
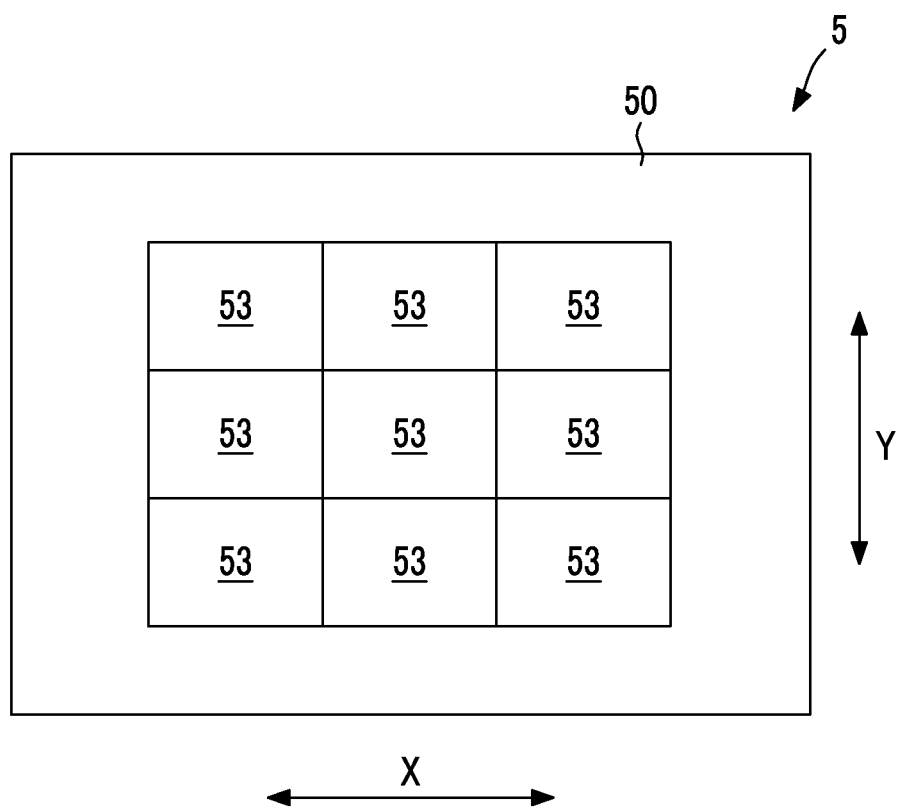
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes an imaging surface 50 on which multiple pixels (signal detection units) are arranged in two dimensions in a row direction X and in a column direction Y orthogonal thereto. In the example of FIG. 2, nine AF areas 53 which are target areas for focusing are provided on the imaging surface 50.

The AF area 53 is an area including imaging pixels and phase difference detection pixels as pixels.

In a portion where the AF areas 53 are excluded on the imaging surface 50, only imaging pixels are disposed. The AF areas 53 may be provided on the imaging surface 50 without a gap.

Figure 3:
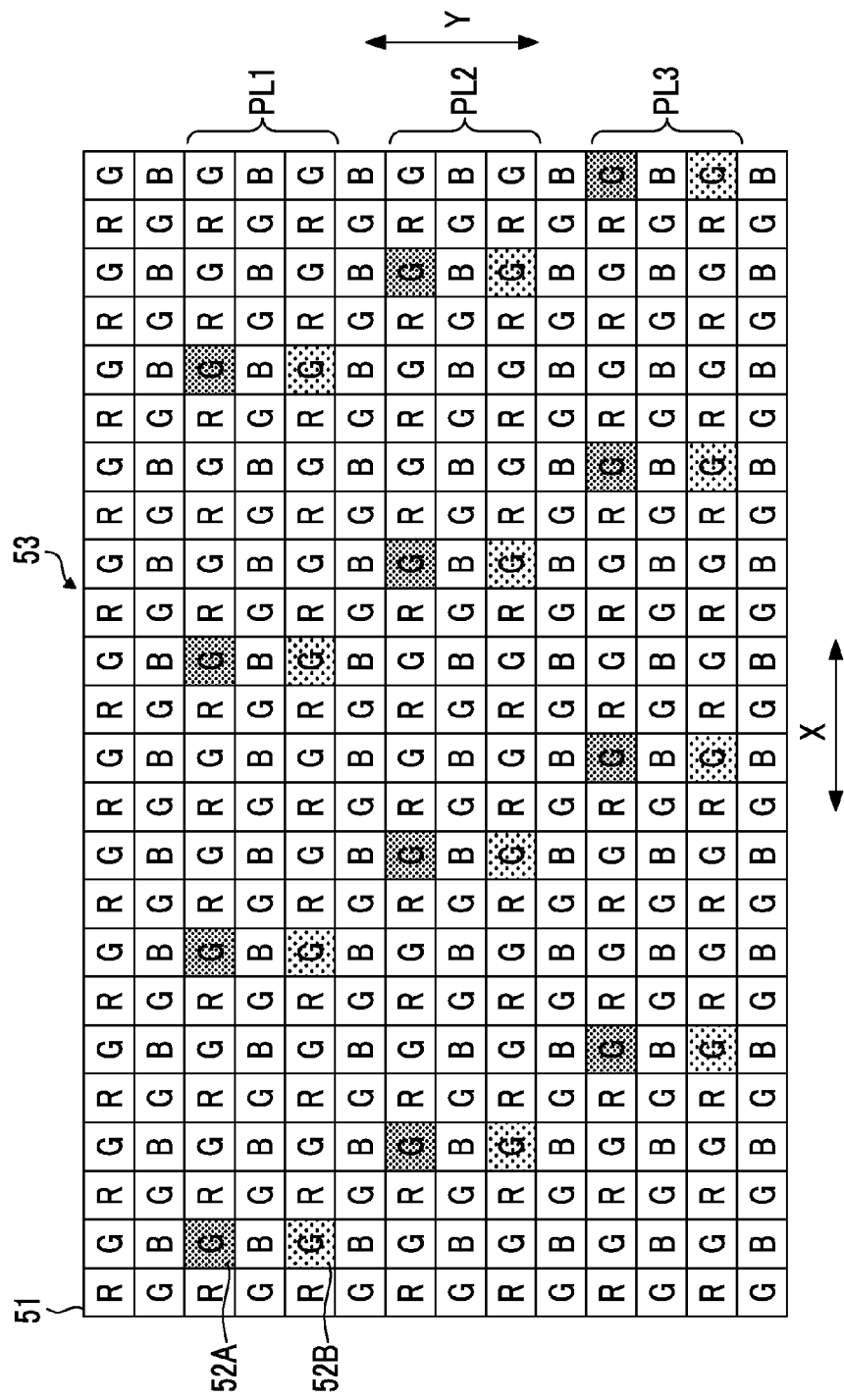
FIG. 3 is a diagram illustrating a configuration of one block that forms one AF area 53 shown in FIG. 2.

FIG. 3 is a diagram illustrating one block of one AF area 53 shown in FIG. 2. The AF area 53 has a configuration in which plural blocks including the block shown in FIG. 3 are arranged in the column direction Y.

In the block of the AF area 53, pixels 51 (indicated by squares with R, G, and B in the figure) are arranged in two dimensions. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The color filters are arranged in the form of a Bayer array over the entirety of the imaging surface 50.

In the block of the AF area 53, a part of the G pixels 51 (shaded pixels in FIG. 3) are used as the phase difference detection pixels 52A and 52B.

The phase difference detection pixel 52A is a first signal detection unit that receives a beam that passes through one divided region in a pupil region of the imaging lens 1, divided in the row direction X and detects a signal depending on the intensity of received light.

The phase difference detection pixel 52B is a second signal detection unit that receives a beam that passes through the other divided region in the pupil region of the imaging lens 1 and detects a signal depending on the intensity of received light.

In the block of the AF area 53, plural pixels 51 other than the phase difference detection pixels 52A and 52B are imaging pixels. Each imaging pixel is a third signal detection unit that receives a beam that passes through the two divided regions in the pupil region of the imaging lens 1 and detects a signal depending on the intensity of received light.

In the block of the AF area 53, the phase difference detection pixel 52A and the phase difference detection pixel 52B which is closest to the phase difference detection pixel 52A in the column direction Y form a pair.

In the block of the AF area 53, plural pair lines, that is, a pair line PL1 in which four pairs are arranged in the row direction X, a pair line PL2 in which four pairs are arranged in the row direction X, and a pair line PL3 in which four pairs are arranged in the row direction X, are arranged in the column direction Y.

Four phase difference detection pixels 52A that respectively form the pair lines PL1, PL2, and PL3 are arranged in the row direction X at a first pitch (distance corresponding to six pixels in the example of FIG. 3), and form a first signal detection unit group.

Four phase difference detection pixels 52B that respectively form the pair lines PL1, PL2, and PL3 are arranged in the row direction X at the first pitch, and form a second signal detection unit group.

In this way, the block of the AF area 53 is a region where plural (three in the example of FIG. 3) first signal detection unit groups and plural second signal detection unit groups are respectively arranged in the column direction Y.

The pair line PL2 is arranged to be shifted rightward by two pixels in the row direction X with respect to the pair line PL1. The pair line PL3 is arranged to be shifted rightward by two pixels in the row direction X with respect to the pair line PL2.

As a result, four phase difference detection pixels 52A in the pair line PL1, four phase difference detection pixels 52A in the pair line PL2, and four phase difference detection pixels 52A in the pair line PL3 are all arranged at different positions in the row direction X.

Similarly, four phase difference detection pixels 52B in the pair line PL1, four phase difference detection pixels 52B in the pair line PL2, and four phase difference detection pixels 52B in the pair line PL3 are all arranged at different positions in the row direction X.

Further, an arrangement pitch of the phase difference detection pixels 52A in a state where four phase difference detection pixels 52A in the pair line PL1, four phase difference detection pixels 52A in the pair line PL2, and four phase difference detection pixels 52A in the pair line PL3 are arranged in the order of positions in the row direction X is set as a second pitch (distance corresponding to two pixels in the example of FIG. 3) shorter than the first pitch.

Similarly, an arrangement pitch of the phase difference detection pixels 52B in a state where four phase difference detection pixels 52B in the pair line PL1, four phase difference detection pixels 52B in the pair line PL2, and four phase difference detection pixels 52B in the pair line PL3 are arranged in the order of positions in the row direction X is set as the second pitch shorter than the first pitch.

Figure 4:
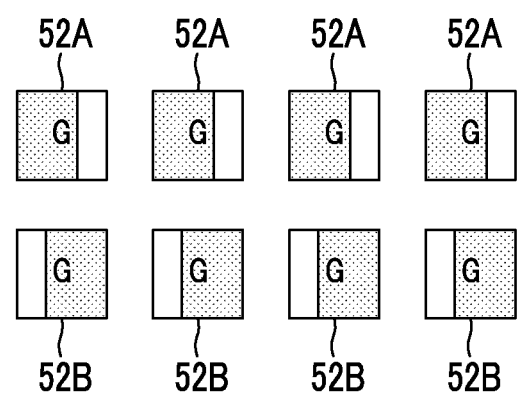
FIG. 4 is a diagram illustrating only phase difference detection pixels 52A and 52B arranged in a pair line PL1 shown in FIG. 3.

FIG. 4 is a diagram illustrating four pairs in one pair line shown in FIG. 3.

A light shielding film is provided above the photoelectric conversion unit of each pixel 51 of the imaging element 5, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

Figure 5:
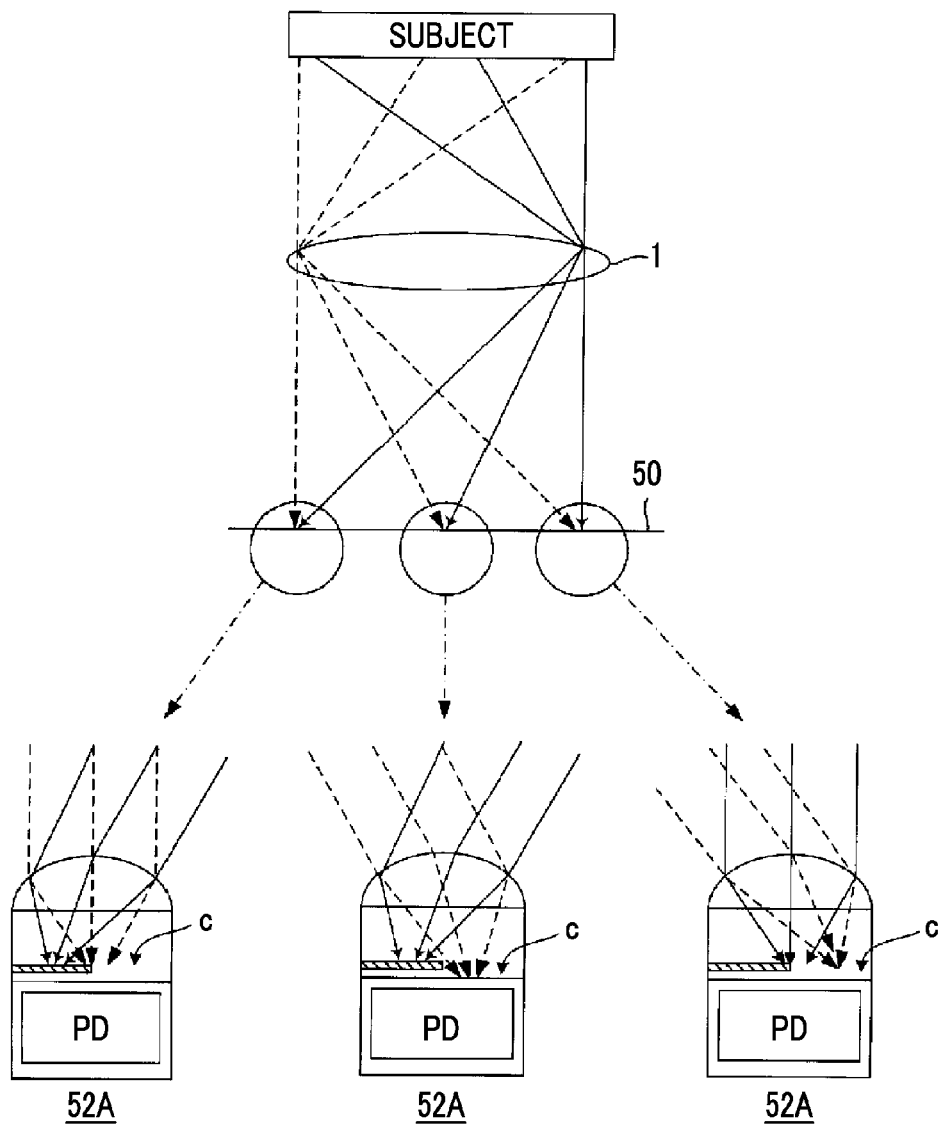
FIG. 5 is a diagram illustrating a sectional configuration of a phase difference detection pixel 52A shown in FIG. 3.

FIG. 5 is a diagram illustrating a sectional configuration of the phase difference pixel 52A. As shown in FIG. 5, an opening c of the phase difference detection pixel 52A is eccentric rightward with respect to the photoelectric conversion unit (PD).

As shown in FIG. 5, by covering one side of the photoelectric conversion unit by the light shielding film, it is possible to selectively shield light incident in a direction opposite to a side where the photoelectric conversion unit is covered by the light shielding film.

With such a configuration, it is possible to detect a phase difference in the row direction X in images respectively captured by two pixel groups in each of the pair lines PL1, P12, and PL3.

The phase difference AF processing unit 19 shown in FIG. 1 determines whether a subject image formed in an AF area 53 includes a frequency component which is equal to or larger than a first threshold value, and generates a defocus amount using any one process among the following first generation process or second generation process. The phase difference AF processing unit 19 functions as a frequency determination unit and a defocus amount generation unit.

(First Generation Process)

The phase difference AF processing unit 19 performs a correlation operation with respect to detection signal groups of the phase difference detection pixels 52A and the phase difference detection pixels 52B for each pair line in an AF area 53 selected from nine AF areas 53 through a user operation or the like, and calculates a phase difference.

The phase difference AF processing unit 19 generates a defocus amount Dfr which is a movement value of the focus lens necessary for matching an image formation surface of a main subject based on the imaging lens 1 and the imaging surface 50 of the imaging element 5, based on the phase difference.

The phase difference AF processing unit 19 calculates an average of the defocus amounts Dfr generated with respect to respective pair lines in the AF area 53, and notifies the system control unit 11 of a defocus amount Df obtained by averaging the defocus amounts Dfr.

(Second Generation Process)

The phase difference AF processing unit 19 performs a correlation operation with respect to a detection signal group where detection signals of all the phase difference detection pixels 52A disposed in an arbitrary block in an AF area 53 selected from nine AF areas 53 through a user operation or the like are arranged in the order of positions in the row direction X and a detection signal group where detection signals of all the phase difference detection pixels 52B disposed in the block are arranged in the order of positions in the row direction X, and generates a defocus amount Df1 based on a result of the correlation operation.

The phase difference AF processing unit 19 generates a defocus amount Df2 from the defocus amount Df1 generated for each block (for example, by averaging the defocus amounts Df1), and notifies the system control unit 11 of the defocus amount Df2.

Figure 6:
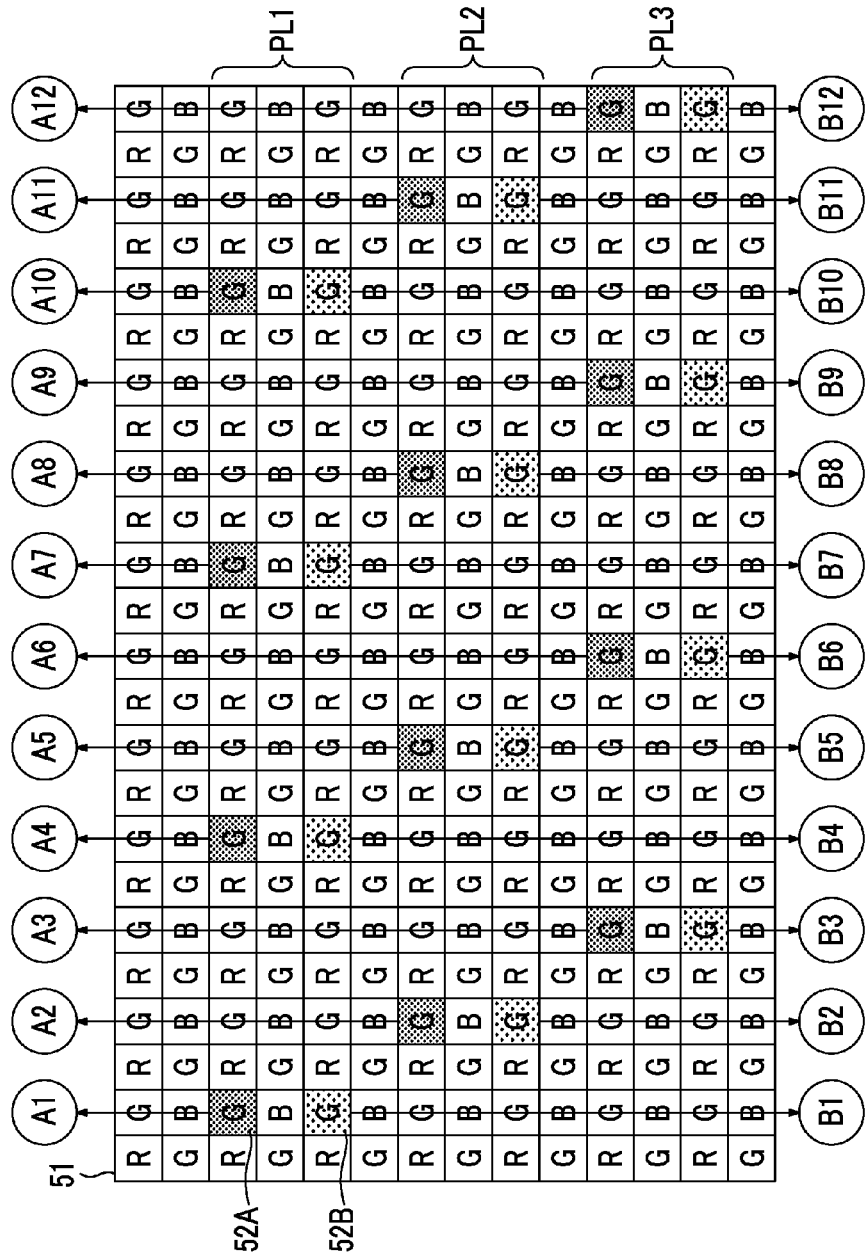
FIG. 6 is a diagram illustrating a second generation process as a defocus amount generation process using a phase difference AF processing unit 19.

FIG. 6 is a diagram illustrating the second generation process. FIG. 6 shows one block shown in FIG. 3.

Detection signals A1 to A12 correspond to a detection signal group where detection signals of all the phase difference detection pixels 52A disposed in the block are arranged in the order of positions in the row direction X. Detection signals B1 to B12 correspond to a detection signal group where detection signals of all the phase difference detection pixels 52B disposed in the block are arranged in the order of positions in the row direction X.

The detection signal group including the detection signals A1 to A12 and the detection signal group including the detection signals B1 to B12 have the same number of detection signals, and have the same sampling interval. Thus, it is possible to calculate a phase difference of subject images formed in the block in the row direction X through the correlation operation with respect to these two detection signal groups, and to generate the defocus amount Df1 from the phase difference.

The sampling interval of the detection signal groups which are correlation operation targets in the second generation process is narrower than the sampling interval of the detection signal groups which are correlation operation targets with respect to the respective pair lines in the first generation process.

Thus, even in a case where a high frequency component is included in the subject images formed in the block, it is possible to detect a phase difference with high accuracy. That is, the second generation process becomes an effective process with respect to a subject including a high frequency component (hereinafter, referred to as a high frequency subject).

On the other hand, in the first generation process, since the sampling interval is wide, detection accuracy of a phase difference is low with respect to a high frequency subject, but in the case of a subject which does not include a high frequency component, it is possible to detect a phase difference with high accuracy in a short time compared with the second generation process. As described above, the first generation process and the second generation process have advantages, respectively.

The phase difference AF processing unit 19 determines whether the subject image formed in the AF area 53 includes a frequency component which is equal to or larger than the first threshold value (hereinafter, referred to as a high frequency component). Then, in a case where it is determined that the subject image includes the high frequency component, the phase difference AF processing unit 19 performs the second generation process, and in a case where it is determined that the subject image does not include the high frequency component, the phase difference AF processing unit 19 performs the first generation process.

Whether the subject image includes the high frequency component may be determined by determining whether a signal of a specific frequency is larger than a threshold value using known Fourier transform.

Specifically, the phase difference AF processing unit 19 calculates a signal intensity $F(u, v)$ of a specific frequency included in image data obtained through imaging based on the pixels 51 in the AF area 53, using the following Expression (a).

$$F(u, v) = \frac{1}{n}\sum_{i=1}^{N}\sum_{j=1}^{N} f(i, j)\exp\{-j2\pi(ui + vj)/N\} \quad (a)$$

In Expression (a), u represents a frequency in the row direction X, v represents a frequency in the column direction Y, i represents the position of a pixel in the row direction X, j represents the position of a pixel in the column direction Y, $f(i, j)$ represents a detection signal of a pixel at the position i and the position j, and N represents the number of pixels arranged in the row direction X and the column direction Y.

By substituting a frequency f1 (first threshold value) which is determined in advance in u and v in Expression (a), it is possible to calculate a signal intensity of the frequency f1 through an operation of Expression (a). The frequency f1 may be set as a lower limit of a frequency at which an error that occurs in a correlation operation result is empirically recognizable.

If the value of $F(u, v)$ is equal to or larger than the threshold value F1, the phase difference AF processing unit 19 determines that the subject image includes the high frequency component, and if the value of $F(u, v)$ is smaller than the threshold value F1, the phase difference AF processing unit 19 determines that the subject image does not include the high frequency component.

Hereinafter, an operation of the digital camera shown in FIG. 1 will be described.

Figure 7:
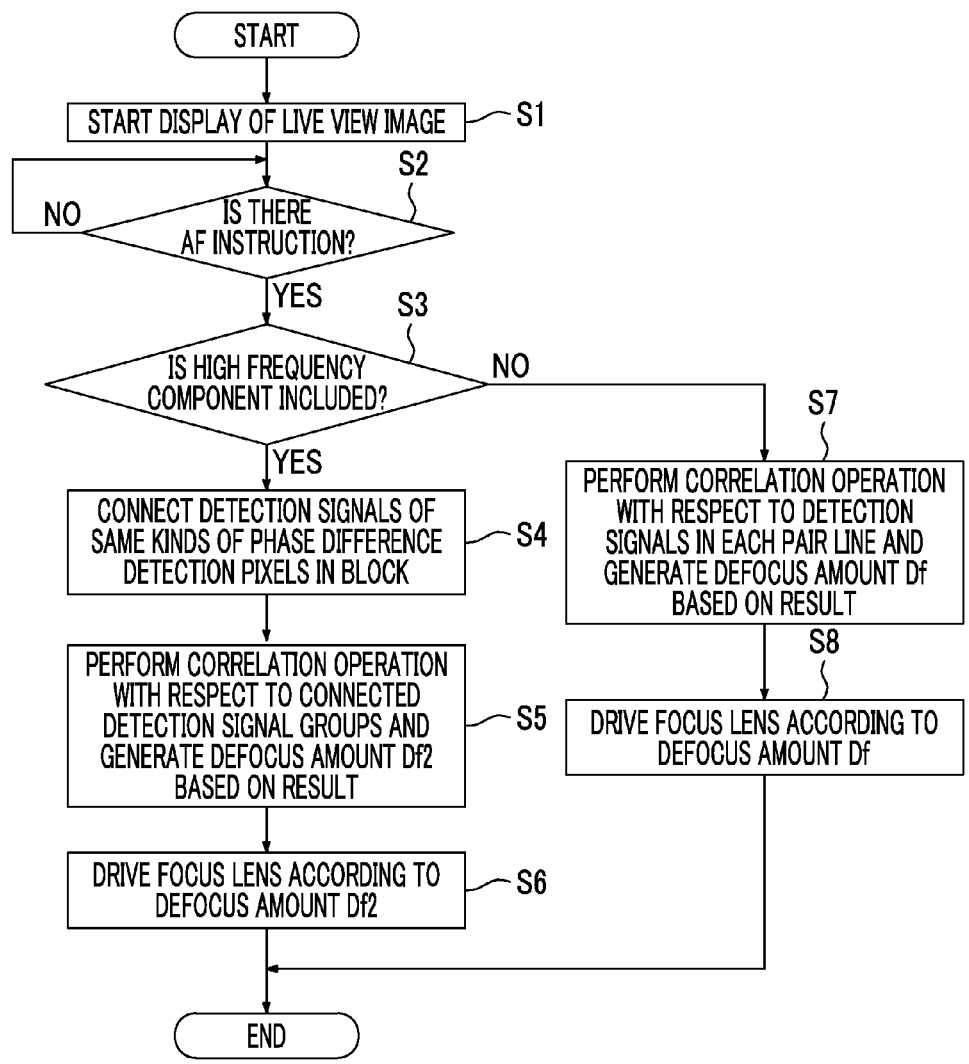
FIG. 7 is a flowchart illustrating an operation of the digital camera shown in FIG. 1.

FIG. 7 is a diagram illustrating the operation of the digital camera shown in FIG. 1.

If the digital camera is set to an imaging mode, the system control unit 11 starts display of a live view image (step S1).

Specifically, the system control unit 11 repeats a control for imaging a subject using the imaging element 5 and displaying an image based on captured image data obtained through the imaging on the display unit 23.

After the display of the live view image is started, if an execution instruction (hereinafter, referred to as an auto-focus execution instruction, which is represented as an AF instruction in the figure) of a focusing control of the imaging optical system is given according to a half-push operation or the like of a shutter button provided in the operation unit 14 (step S2: YES), the phase difference AF processing unit 19 determines whether a subject image formed in a selected AF area 53 includes a high frequency component, using the latest image signals (hereinafter, referred to as captured image signals Ga) among captured image signals obtained when the auto-focus execution instruction is given.

In a case where it is determined that the subject image includes the high frequency component (step S3: YES), the phase difference AF processing unit 19 performs the process of step S4, and in a case where it is determined that the subject image does not include the high frequency component (step S3: NO), the phase difference AF processing unit 19 performs the process of step S7.

In step S7, the phase difference AF processing unit 19 performs a correlation operation with respect to a detection signal group of the phase difference detection pixels 52A and a detection signal group of the phase difference detection pixels 52B with respect to the respective pair lines in the selected AF area 53, and generates a defocus amount Dfr based on the result. Further, the phase difference AF processing unit 19 calculates an average of the defocus amounts Dfr generated with respect to the respective pair lines, and generates a defocus amount Df.

The defocus amount Df is generated, thereby the generated defocus amount Df is notified to the system control unit 11. The system control unit 11 drives the focus lens by the defocus amount Df according to the defocus amount Df to perform a focusing control (step S8).

The system control unit 11 functions as a focusing control unit that performs a focusing control based on the defocus amount Dfr generated by the phase difference AF processing unit 19.

In step S4, the phase difference AF processing unit 19 connects detection signals of the phase difference detection pixels 52B in the order of positions in the row direction X, and connects detection signals of the phase difference detection pixels 52A in the order of positions in the row direction X with respect to each block in the selected AF area 53.

The phase difference AF processing unit 19 performs a correlation operation with respect to two detection signal groups obtained through the connection, and generates a defocus amount Df1 from a result of the correlation operation. Further, the phase difference AF processing unit 19 calculates an average of the defocus amounts Df1 generated with respect to the respective blocks, and generates a defocus amount Df2 (step S5).

The defocus amount Df2 is generated, thereby the generated defocus amount Df2 is notified to the system control unit 11. The system control unit 11 drives the focus lens by the defocus amount Df2 according to the defocus amount Df2 to perform a focusing control (step S6).

The system control unit 11 functions as a focusing control unit that performs a focusing control based on the defocus amount Df1 generated by the phase difference AF processing unit 19.

As described above, the digital camera shown in FIG. 1 may perform a correlation operation by setting a signal detection group having a narrow sampling interval in the second generation process while widening an arrangement interval of phase difference detection pixels in the row direction X provided in each block.

Thus, in a case where detection signals of phase difference detection pixels are interpolated, it is possible to perform interpolation using detection signals of a large number of imaging pixels 51, and to enhance the quality of captured images by reducing the number of phase difference detection pixels to be interpolated. Further, even in a high frequency subject, it is possible to perform a focusing control based on the phase difference AF method with high accuracy. Accordingly, it is possible to achieve enhancement of the quality of captured images and enhancement of the accuracy of the focusing control in parallel.

Figure 8:
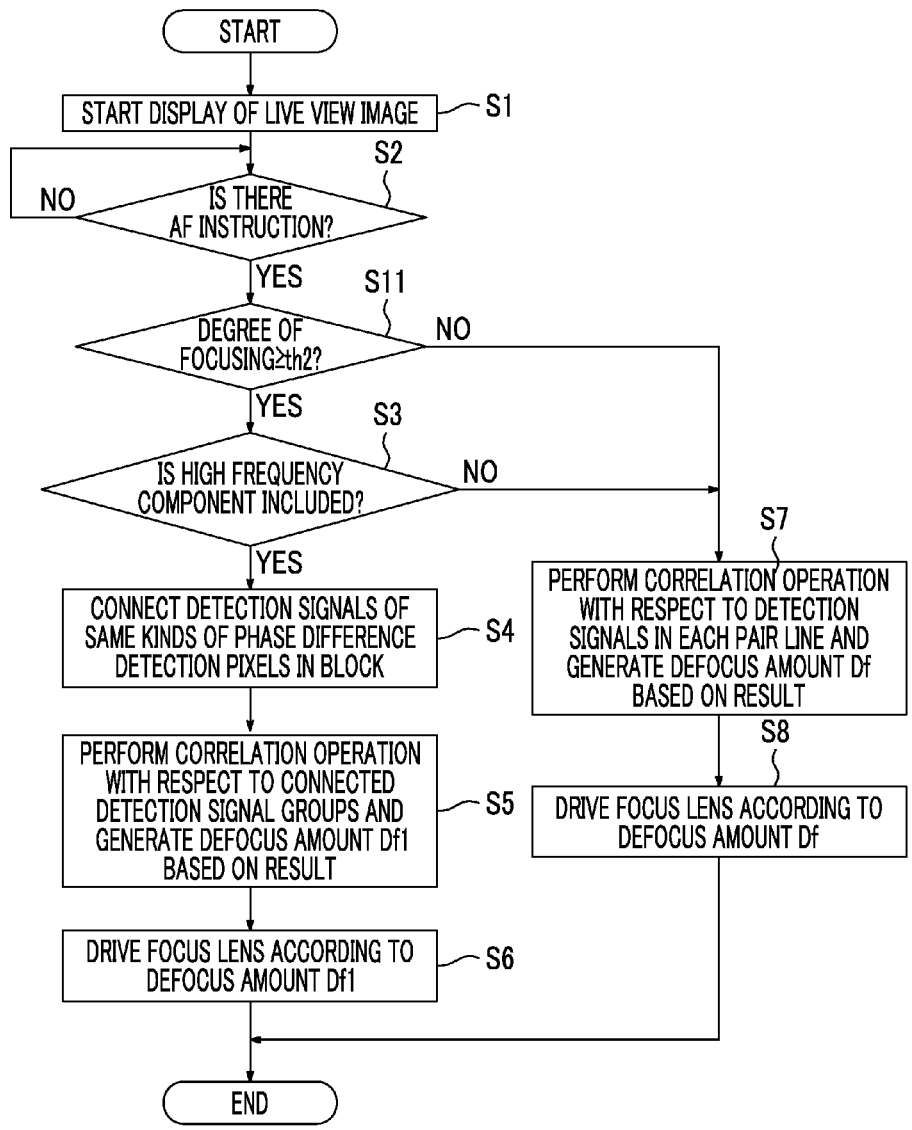
FIG. 8 is a flowchart illustrating a modification example of the operation of the digital camera shown in FIG. 1.

FIG. 8 is a flowchart illustrating a modification example of the operation of the digital camera shown in FIG. 1. The flowchart shown in FIG. 8 is the same as in FIG. 7 except that step S11 is added between step S2 and step S3. In FIG. 8, the same reference numerals are given to the same processes as in FIG. 7, and description thereof will not be repeated.

If there is an AF instruction, in step S11, the phase difference AF processing unit 19 determines whether the degree of focusing of a subject image formed in a selected AF area 53 is equal to or larger than a second threshold value th2.

If F(u, v) calculated by substituting a frequency f2 which is lower than the frequency f1 as u and v in Expression (a) is equal to or larger than a threshold value th1, it may be determined that a low frequency component occupies a most part of the subject image, and thus, the phase difference AF processing unit 19 determines that the degree of focusing is smaller than the second threshold value th2 (large blur state).

On the other hand, if F(u, v) calculated by substituting the frequency f2 is smaller than the threshold value th1, it may be determined that a low frequency component does not occupy a most part of the subject image, and thus, the phase difference AF processing unit 19 determines that the degree of focusing is equal to or larger than the second threshold value th2 (non-large blur state).

Alternatively, the phase difference AF processing unit 19 calculates an absolute value of a difference between detection signals of adjacent pixels 51, with respect to the imaging pixels 51 in a selected AF area 53, and calculates a value obtained by integrating the absolute values of the differences as a contrast value of the subject image formed in the selected AF area 53.

If the contrast value is smaller than a threshold value th3, it may be determined that the degree of focusing is in a large blur state. Thus, if the contrast value is equal to or larger than the threshold value th3, the phase difference AF processing unit 19 sets the determination of step S11 as YES. If the contrast value is smaller than the threshold value th3, the phase difference AF processing unit 19 sets the determination of step S11 as NO.

If the determination of step S11 is NO, the phase difference AF processing unit 19 performs the process of step S7. If the determination of step S11 is YES, the phase difference AF processing unit 19 performs the process of step S3.

In this way, in a case where the degree of focusing of the subject image formed in the selected AF area 53 is low, the phase difference AF processing unit 19 performs the second generation process regardless of whether the subject image includes a high frequency component. The phase difference AF processing unit 19 functions as a focusing degree determination unit.

In a case where the degree of focusing is low, that is, in the case of large blur, regardless of whether an interval of detection signals for performing a correlation operation is wide or narrow, its result does not greatly change. Thus, in a case where the degree of focusing is low, the procedure directly goes to step S7, and thus, it is possible to reduce time until focusing is completed.

The digital camera according to this embodiment includes a still image capturing mode where data on a still image obtained by imaging using the imaging element 5 is recorded on a recording medium 21, and a video image capturing mode where data on a video image obtained by imaging using the imaging element 5 is recorded on the recording medium 21, as imaging modes.

In the video image capturing mode, a continuous AF for continuously performing a focusing control even during continuous imaging is performed. In the video image capturing mode, since it is necessary to increase a reading speed of a captured image signal from the imaging element 5, the system control unit 11 performs thinning-out driving for reading detection signals of from only a part of all pixels.

For example, in FIG. 3, detection signals of phase difference detection pixels are read from the pair line PL1 and the pair line PL3, but detection signals of phase difference detection pixels are not read from the pair line PL2.

If the thinning-out driving is performed, detection signal groups where detection signals of the phase difference detection pixels 52A read from the pair line PL1 and the pair line PL3 are arranged in the order of positions in the row direction X are not obtained at regular intervals, and thus, it is not possible to perform an accurate correlation operation in the second generation process.

Accordingly, the phase difference AF processing unit 19 may perform any one of the first generation process and the second generation process according to whether a high frequency component is included in a subject image in the still image capturing mode, as described in FIG. 7, and may perform only the first generation process in the video image capturing mode. Thus, it is possible to prevent deterioration in imaging quality of a video image in the video image capturing mode.

Figure 9:
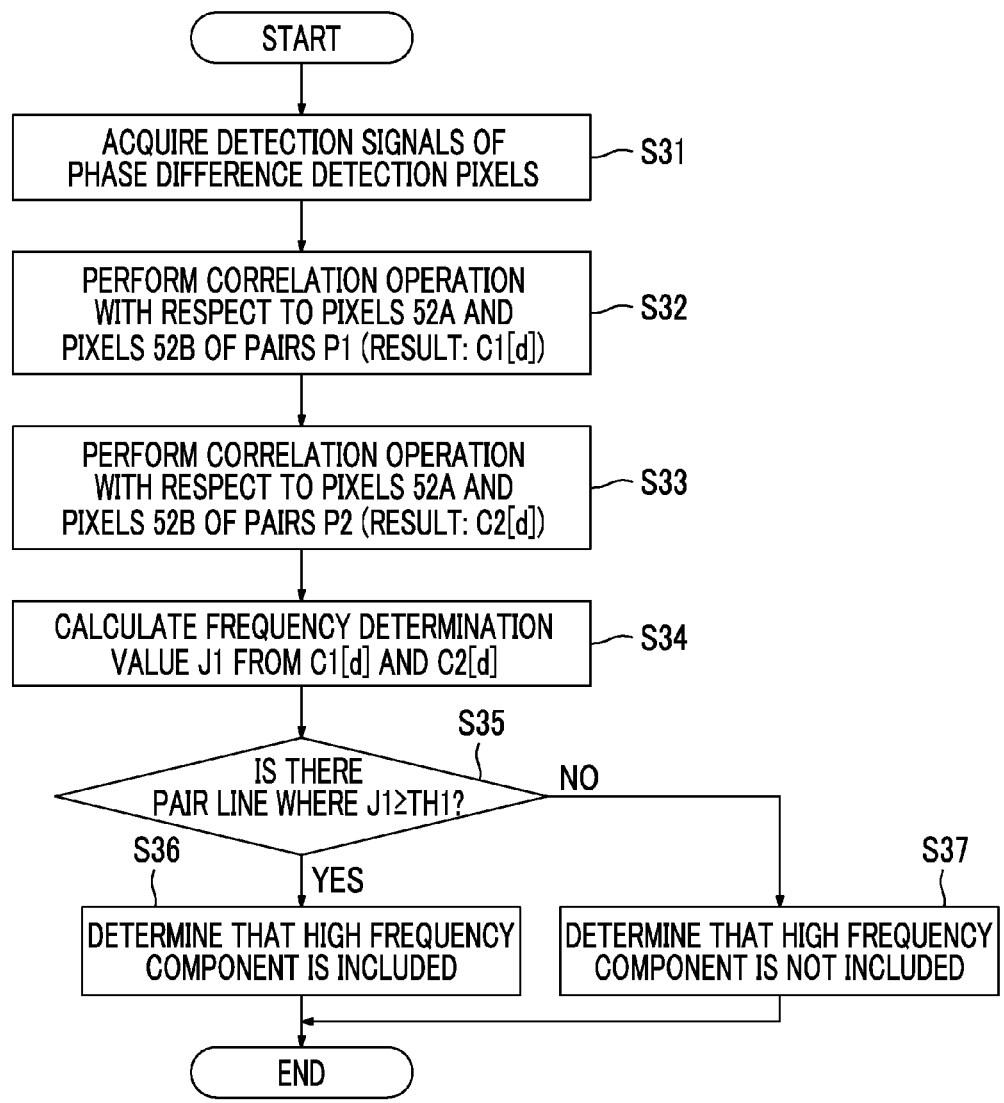
FIG. 9 is a flowchart illustrating details of step S3 in FIG. 7.

FIG. 9 is a flowchart illustrating a modification example of the process of step S3 in FIG. 7.

If there is an AF instruction in step S2, the phase difference AF processing unit 19 acquires detection signals of the phase difference detection pixels 52A and the phase difference detection pixels 52B in a selected AF area 53 (step S31).

Figure 10:
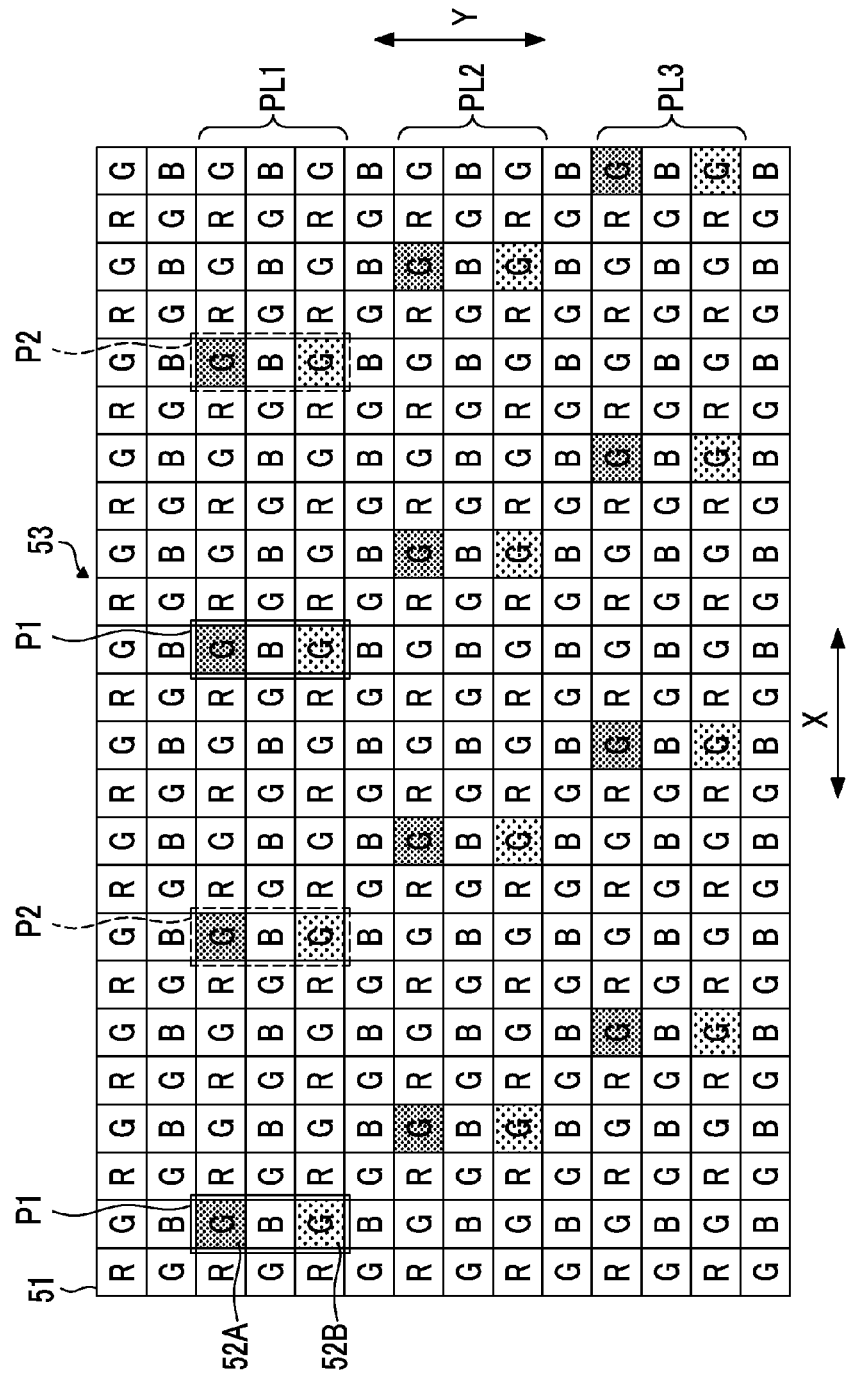
FIG. 10 is a diagram illustrating processes of FIG. 9.

Then, the phase difference AF processing unit 19 performs a correlation operation with respect to a detection signal group of the phase difference detection pixels 52A and a detection signal group of the phase difference detection pixels 52B, obtained from the first pairs P1 of a third signal detection unit group including plural phase difference detection pixels 52A (odd-numbered phase difference detection pixels 52A from the left end among four phase difference detection pixels 52A in the pair line PL1 in FIG. 10) arranged in the row direction X with respect to each pair lines in the selected AF area 53 and a fourth signal detection unit group including plural phase difference detection pixels 52B (phase difference detection pixels 52B that form pairs with the phase difference detection pixels 52A of the third signal detection unit group) arranged at the same distance in one direction with respect to the respective phase difference detection pixels 52A of the third signal detection unit group (step S32).

Specifically, when data on one detection signal group is represented as A[1], . . . , A[k] and data on the other detection signal group is represented as B[1], . . . , B[k], an area C[d] surrounded by two data waveforms obtained by the following Expression (1) when the two pieces of data are shifted by a shift amount "d" is calculated.

$$C[d] = \sum_{n=1}^{k} (A[n+d] - B[n])^2 \qquad (1)$$

$$d = -L, \ldots, -2, -1, 0, 1, 2, \ldots, L$$

Hereinafter, a result of the correlation operation in step S32 is represented as C1[d]. The correlation operation result C1[d] becomes a value indicating a first matching degree which is a matching degree of images respectively captured by the phase difference detection pixels 52A and the phase difference detection pixels 52B of the first pairs P1.

Subsequently, the AF processing unit 19 performs a correlation operation with respect to a detection signal group of the phase difference detection pixels 52A and a detection signal group of the phase difference detection pixels 52B, obtained from the second pairs P2 of a fifth signal detection unit group including plural phase difference detection pixels 52A (even-numbered phase difference detection pixels 52A from the left end among four phase difference detection pixels 52A in the pair line PL1 in FIG. 10) arranged at the same distance in one direction with respect to the respective phase difference detection pixels 52A of the third signal detection unit group and arranged in the row direction X and a sixth signal detection unit group including plural phase difference detection pixels 52B (phase difference detection pixels 52B that form pairs with the phase difference detection pixels 52A of the fifth signal detection unit group) arranged at the same distance in one direction with respect to the respective phase difference detection pixels 52A of the fifth signal detection unit group (step S33).

A result of the correlation operation is represented as C2[d]. The correlation operation result C2[d] becomes a value indicating a second matching degree which is a matching degree of images respectively captured by the phase difference detection pixels 52A and the phase difference detection pixels 52B of the second pairs P2.

In a case where a frequency of a subject image formed in an arbitrary pair line is low, when the transverse axis represents a shift amount d and the longitudinal axis represents C[d], shapes of graphs become approximately the same with respect to C1[d] and C2[d]. However, in a case where the frequency of the subject image formed in the arbitrary block is high, the shapes of the graphs become considerably different from each other with respect to C1[d] and C2[d].

The phase difference AF processing unit 19 compares the shape of the graph based on C1[d] with the shape of the graph based on C2[d], to generate a frequency determination value J1 for determining the magnitude of a frequency of a subject image formed in the selected AF area 53.

Specifically, the phase difference AF processing unit 19 performs an operation of the following Expression (2) to generate the frequency determination value J1 as a numerical value indicating a result of comparison of the correlation operation result C1[d] and the correlation operation result C2[d] (step S34).

$$J1 = \frac{\sum_{d=-L}^{L} |C1[d] - C2[d]|}{\sum_{d=-L}^{L} C1[d] + \sum_{d=-L}^{L} C2[d]} \qquad (2)$$

A numerator of Expression (2) becomes a small value in a case where the shape of the graph based on C1[d] and the shape of the graph based on C2[d] are close to each other, and becomes a large value in a case where the two shapes are different from each other.

The phase difference AF processing unit 19 generates the frequency determination value J1 for each pair line in step S34, and then, compares the frequency determination value J1 for each pair line with a predetermined threshold value TH1. If there is a pair line where the frequency determination value J1 is equal to or larger than the threshold value TH1 (step S35: YES), it may be determined that the subject image formed in the selected AF area 53 includes a high frequency component (step S36).

Further, if there is no pair line where the frequency determination value J1 is equal to or larger than the threshold value TH1 (step S35: NO), the phase difference AF processing unit 19 determines that the subject image formed in the selected AF area 53 does not include a high frequency component (step S37).

In this way, the phase difference AF processing unit 19 determines whether a high frequency component is included in a subject image formed in an AF area 53, based on a result of comparison (frequency determination value J1) of the first matching degree and the second matching degree.

As described above, according to the modification example of FIG. 9, it is possible to determine whether a subject image formed in an AF area 53 includes a high frequency component only using detection signals of the phase difference detection pixels 52A and 52B, without using detection signals of the imaging pixels 51. Thus, it is possible to perform the determination in step S3 of FIG. 7 in a short time. In addition, in the determination, since it is possible to omit reading of detection signals of the imaging pixels 51, it is possible to reduce power consumption.

In FIG. 9, correlation operation results are used as the first matching degree and the second matching degree. As the matching degrees, information other than the correlation operation results may be used.

Specifically, the phase difference AF processing unit 19 generates a ratio between an integrated value of detection signals of the phase difference detection pixels 52A and an integrated value of detection signals of the phase difference detection pixels 52B, which are output from the first pairs P1, as a matching degree of two images captured by the first pairs P1.

Similarly, the phase difference AF processing unit 19 generates a ratio between an integrated value of detection signals of the phase difference detection pixels 52A and an integrated value of detection signals of the phase difference detection pixels 52B, which are output from the second pairs P2, as a matching degree of two images captured by the second pairs P2.

In a case where frequencies of subject image formed in the first pairs P1 is low, the integrated value of the detection signals of the phase difference detection pixels 52A of the first pairs P1 and the integrated value of the detection signals of the phase difference detection pixels 52B of the first pairs P1 become approximately the same value except for a difference due to a phase difference between the images captured by the phase difference detection pixels 52A and the images captured by the phase difference detection pixels 52B.

Further, the integrated value of the detection signals of the phase difference detection pixels 52A of the second pairs P2 and the integrated value of the detection signals of the phase difference detection pixels 52B of the second pairs P2 become approximately the same value except for a difference due to a phase difference.

Figure 11:
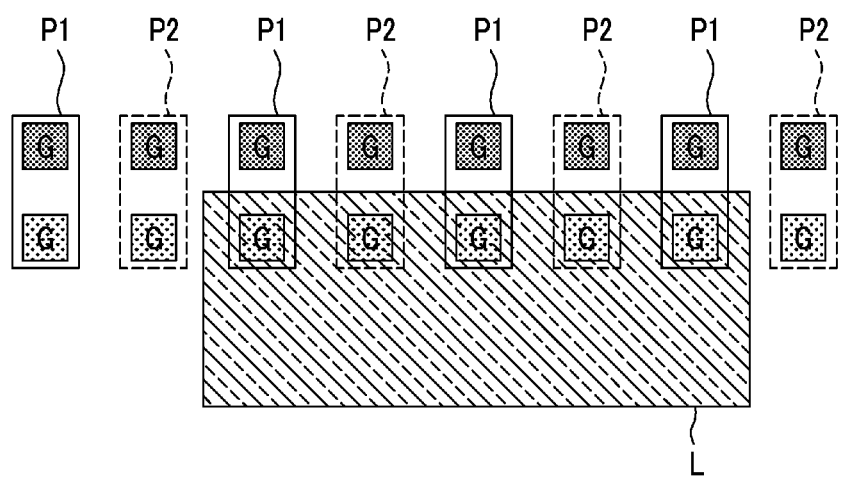
FIG. 11 is a diagram illustrating an example in which a dark portion L that extends in a row direction X is formed in the pair line PL1.

On the other hand, as shown in FIG. 11, in a case where a dark portion L is formed in a pair line where the first pairs P1 and the second pairs P2 are alternately arranged, the integrated value of the detection signals of the phase difference detection pixels 52A of the first pairs P1 and the integrated value of the detection signals of the phase difference detection pixels 52B of the first pairs P1 become considerably different values even except for the difference due to the phase difference.

Further, the integrated value of the detection signals of the phase difference detection pixels 52A of the second pairs P2 and the integrated value of the detection signals of the detection signals of the phase difference detection pixels 52B of the second pairs P2 become considerably different values even except for the difference due to the phase difference.

In this way, with only comparison between the integrated value of the detection signals of the phase difference detection pixels 52A that belong to the first pairs P1 with the integrated value of the detection signals of the phase difference detection pixels 52B that belong to the first pairs P1, it is difficult to determine whether a difference between the integrated values is generated by a phase difference or by a high frequency subject.

In both of the first pairs P1 and the second pairs P2, the same phase difference occurs in captured images. Using this, by subtracting a ratio between the integrated value of the detection signals of the phase difference detection pixels 52A of the second pairs P2 and the integrated value of the detection signals of the phase difference detection pixels 52B of the second pairs P2 from a ratio between the integrated value of the detection signals of the phase difference detection pixels 52A of the first pairs P1 and the integrated value of the detection signals of the phase difference detection pixels 52B of the first pairs P1, it is possible to cancel out the difference of the integrated values due to the phase difference. If the difference of the integrated values due to the phase difference can be canceled out, it is possible to determine the presence or absence of the dark portion L as shown in FIG. 11.

Thus, the phase difference AF processing unit 19 generate a frequency determination value J3 for determining frequencies of subject images formed in a pair line, by the following operation expression (4).

$$J3 = \left| \frac{\sum P1A}{\sum P1B} - \frac{\sum P2A}{\sum P2B} \right| \quad (4)$$

In Expression (4), $\Sigma P1A$ represents an integrated value of detection signals of the phase difference detection pixels 52A that belong to the first pairs P1 disposed in a pair line.

$\Sigma P1B$ represents an integrated value of detection signals of the phase difference detection pixels 52B that belong to the first pairs P1 disposed in the pair line.

$\Sigma P2A$ represents an integrated value of detection signals of the phase difference detection pixels 52A that belong to the second pairs P2 disposed in the pair line.

$\Sigma P2B$ represents an integrated value of detection signals of the phase difference detection pixels 52B that belong to the second pairs P2 disposed in the pair line.

In a case where the value of the frequency determination value J3 is large, it is possible to determine that the dark portion L is present as shown in FIG. 11, that is, there is a high frequency object.

When phase difference AF processing unit 19 compares a value of the frequency determination value J3 with a predetermined threshold value TH2. If the frequency determination value J3 is equal to or larger than the threshold value TH2, the phase difference AF processing unit 19 sets the determination in step S3 of FIG. 7 as YES, and if the frequency determination value J3 is smaller than the threshold value TH2, the phase difference AF processing unit 19 sets the determination in step S3 of FIG. 7 as NO.

FIG. 12 is a flowchart illustrating a modification example of step S3 of FIG. 7.

If there is an AF instruction, first, the phase difference AF processing unit 19 acquires detection signals of the phase difference detection pixels 52A and the phase difference detection pixels 52B disposed in a selected AF area 53 (step S41).

Then, the phase difference AF processing unit 19 integrates output signals of the phase difference detection pixels 52A of the first pairs P1 that form an arbitrary pair line among the acquired detection signals to obtain an integrated value $\Sigma P1A$ (step S42).

Then, the phase difference AF processing unit 19 integrates output signals of the phase difference detection pixels 52B of the first pairs P1 that form the arbitrary pair line among the acquired detection signals to obtain an integrated value ΣP1B (step S43).

Then, the phase difference AF processing unit 19 integrates output signals of the phase difference detection pixels 52A of the second pixel pairs P2 that form the arbitrary pair line among the acquired detection signals to obtain an integrated value ΣP2A (step S44).

Then, the phase difference AF processing unit 19 integrates output signals of the phase difference detection pixels 52B of the second pixel pairs P2 that form the arbitrary pair line among the acquired detection signals to obtain an integrated value ΣP2B (step S45).

Then, the phase difference AF processing unit 19 generates the frequency determination value J3 by an operation of Expression (4), based on ΣP1A, ΣP1B, ΣP2A, and ΣP2B (step S46).

After the frequency determination value J3 is generated for each pair line, the phase difference AF processing unit 19 compares the frequency determination value J3 for each pair line with the threshold value TH2. Further, in a case where there is a pair line where the frequency determination value J3 is equal to or larger than the threshold value TH2 (step S47: YES), the phase difference AF processing unit 19 determines that a subject image formed in the selected AF area 53 includes a high frequency component (step S48).

In a case where there is no pair line where the frequency determination value J3 is equal to or larger than the threshold value TH2 (step S47: NO), the phase difference AF processing unit 19 determines that the subject image formed in the selected AF area 53 does not include a high frequency component (step S49).

As described above, according to the operation example shown in FIG. 12, it is possible to determine whether a high frequency component is included in a subject image without performing a correlation operation, and to perform the determination of step S3 in FIG. 7 at high speed.

Next, another method for determining whether a subject image includes a high frequency component will be described.

Figure 13A:
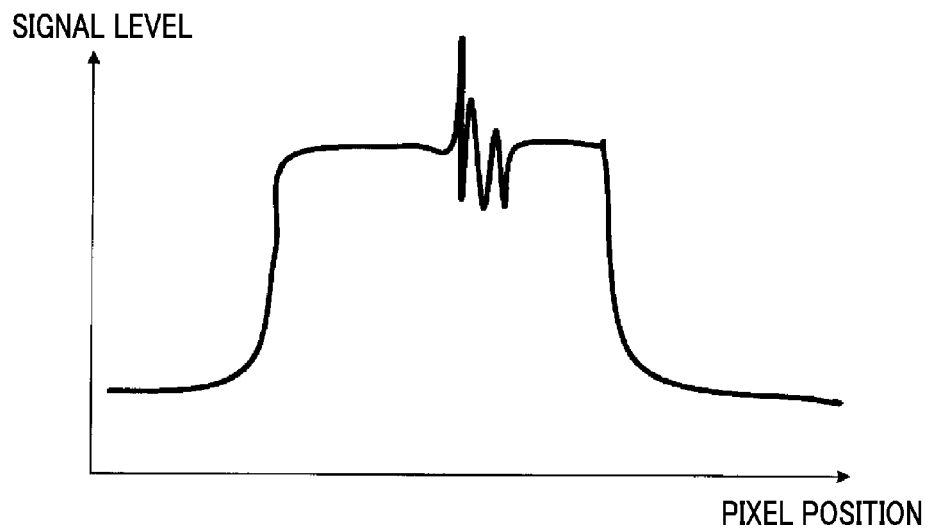
FIGS. 13A and 13B are diagrams illustrating detection signal waveforms of phase difference detection pixel groups when a high frequency component is included in a subject image.
Figure 13B:
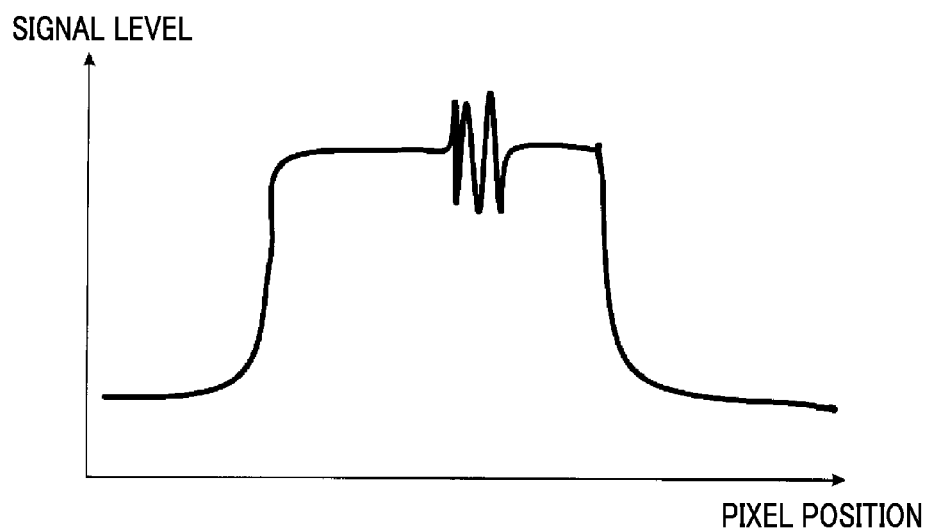

FIG. 13A is a diagram illustrating an example of detection signals of the respective phase difference detection pixels 52A of the first pairs P1 in FIG. 9. FIG. 13B is a diagram illustrating an example of detection signals of the respective phase difference detection pixels 52B of the first pairs P1 in FIG. 9.

Since the respective phase difference detection pixels 52A of the first pairs P1 and the respective phase difference detection pixels 52B of the first pairs P1 are spaced by two pixels in the column direction Y, they capture approximately the same subject images.

However, if a high frequency part is locally present in a subject image formed in the first pairs P1, as shown in FIGS. 13A and 13B, a detection signal waveform of the respective phase difference detection pixels 52A of the first pairs P1 and a detection signal waveform of the respective phase difference detection pixels 52B of the first pairs P1 are approximately the same in a low frequency part, but are different from each other in the high frequency part.

The phase difference AF processing unit 19 shifts the waveform shown in FIG. 13A and the waveform shown in FIG. 13B with respect to each other in the row direction X, and calculates a correlation value which is an area surrounded by the two waveforms at each shifted position as the C1[$d$].

Figure 14:
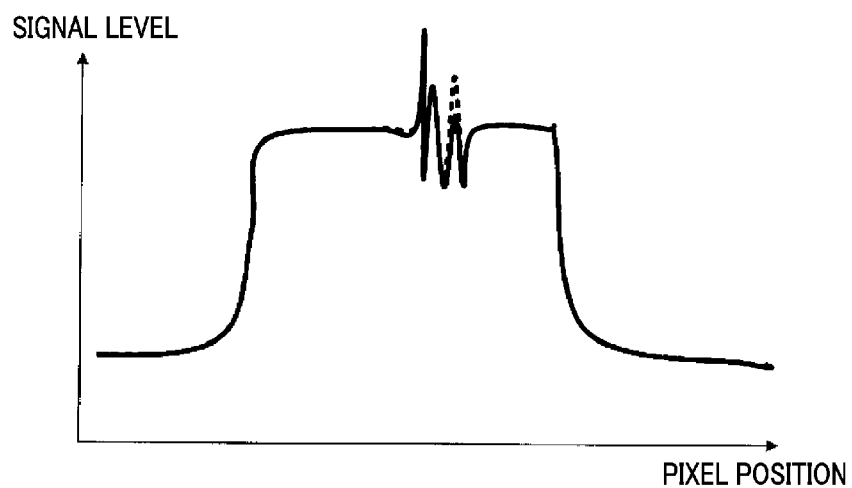
FIG. 14 is a diagram illustrating a positional relationship between waveforms when a correlation value becomes a minimum in the waveforms shown in FIGS. 13A and 13B.

FIG. 14 shows a positional relationship between the waveform shown in FIG. 13A and the waveform shown in FIG. 13B when the value of C1[$d$] becomes a minimum. As shown in FIG. 14, even when the value of C1[$d$] becomes a minimum, a matching degree of two data waveforms is low at a high frequency part (a part where a signal level finely varies in the figure).

Similarly, with respect to the second pairs P2, if a high frequency part is locally present in a subject image formed in the second pairs P2, a detection signal waveform of the respective phase difference detection pixels 52A of the second pairs P2 and a detection signal waveform of the respective phase difference detection pixels 52B of the second pairs P2 are approximately the same in a low frequency part, but are different from each other in the high frequency part. Accordingly, even when the value of C2[$d$] calculated by the phase difference AF processing unit 19 becomes a minimum, a matching degree of two data waveforms is low.

Figure 15:
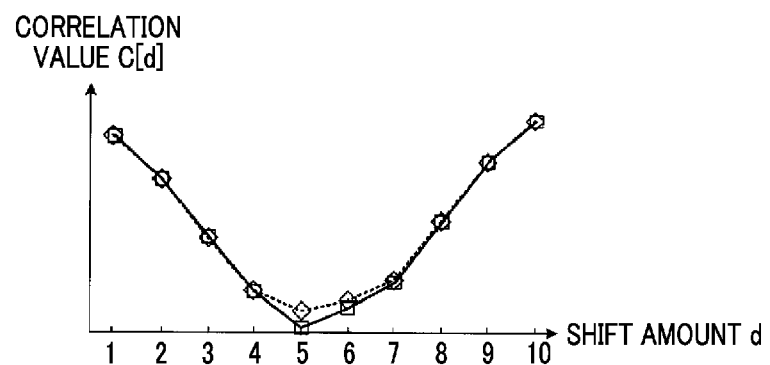
FIG. 15 is a diagram illustrating correlation operation results in pairs P1 and pairs P2 when a high frequency component is included in a subject image.

FIG. 15 is a diagram illustrating respective correlation operation results of the first pairs P1 and the second pairs P2 when a high frequency part is included in subject images captured by the first pairs P1 and the second pairs P2. A graph indicated by a solid line in FIG. 15 represents the correlation operation result C1[$d$] of the first pairs P1, and a graph indicated by a dotted line in FIG. 15 represents the correlation operation result C2[$d$] of the second pairs P2.

Since the respective pixels of the first pairs P1 and the respective pixels of the second pairs P2 are adjacently arranged, the subject images captured by the first pairs P1 and the second pairs P2 are approximately the same. Thus, as shown in FIG. 15, even in a case where a high frequency part is locally included in the subject images captured by the first pairs P1 and the second pairs P2, the shapes of C1[$d$] and C2[$d$] approximately match each other as a whole. However, as described above, in a part where a correlation value becomes a minimum, a considerable difference occurs in C1[$d$] and C2[$d$] due to the influence of a difference of images due to the high frequency part.

It may also be considered that a high frequency part is formed in only one of images captured by the first pairs P1 and the second pairs P2, but even in this case, since one of a minimum value of C1[$d$] and a minimum value of C2[$d$] becomes small and the other one thereof becomes large, a considerable difference occurs therebetween.

From this review, the inventors found that in a case where a great difference occurs between the minimum value of C1[$d$] and the minimum value of C2[$d$], it is possible to determine that a high frequency part is included in subject images captured by the first pairs P1 and the second pairs P2.

In step S3 of FIG. 7, the phase difference AF processing unit 19 determines whether a subject image formed in a selected AF area 53 includes a high frequency component based on a result of comparison of the minimum value of C1[$d$] and the minimum value of C2[$d$].

Figure 16:
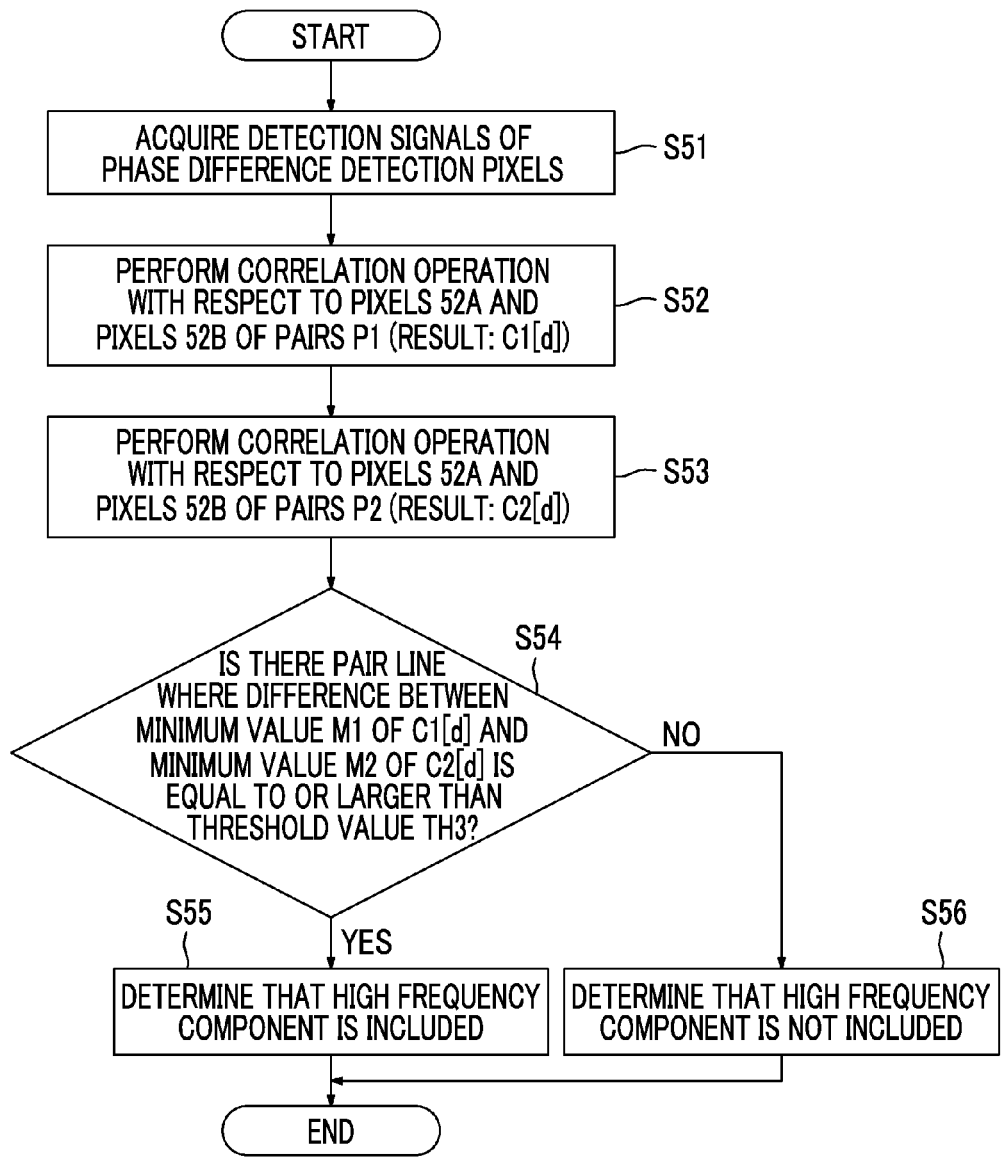
FIG. 16 is a flowchart illustrating a modification example of step S3 in FIG. 7.

FIG. 16 is a flowchart illustrating a modification example of the process of step S3 shown in FIG. 7.

If there is an AF instruction, the phase difference AF processing unit 19 acquires detection signals of the phase difference detection pixels 52A and the phase difference detection pixels 52B in a selected AF area 53 (step S51).

Then, the phase difference AF processing unit 19 performs a correlation operation with respect to detection signal groups of the phase difference detection pixels 52A and the phase difference detection pixels 52B of the first pairs P1 that form an arbitrary pair line among the acquired detection signals (step S52). A result of the correlation operation in step S52 is C1[d].

Subsequently, the phase difference AF processing unit 19 performs a correlation operation with respect to detection signal groups of the phase difference detection pixels 52A and the phase difference detection pixels 52B of the second pairs P2 that form the arbitrary pair line among the acquired detection signals (step S53). A result of the correlation operation in step S53 is C2[d].

Then, the phase difference AF processing unit 19 calculates a difference (absolute value) between a minimum value M1 (first correlation value) of C1[d] calculated in step S52 and a minimum value M2 (second correlation value) of C2[d] calculated in step S53. The phase difference AF processing unit 19 compares the difference calculated for each pair line with a threshold value TH3, and determines whether there is a pair line where the difference is equal to or larger than the threshold value TH3 (step S54).

If there is a pair line where |M1−M2|≥TH3 (step S54: YES), the phase difference AF processing unit 19 determines that a subject image formed in a selected AF area 53 includes a high frequency component (step S55).

If there is no pair line where |M1−M2|≥TH3 (step S54: NO), the phase difference AF processing unit 19 determines that the subject image formed in the selected AF area 53 does not include a high frequency component (step S56).

Here, M1 and M2 respectively represent the minimum values of C1[d] and C2[d], but an approximation function based on a known quadratic function or the like may be calculated using the correlation value C1[d] as a function of the shift amount d, and minimum values of the approximation function may be used as M1 and M2. In this case, the shift amount d in which a correlation value becomes a minimum may be a decimal value. Further, the shift amounts in which C1[d] and C2[d] become minimums may have different values.

As described above, according to the modification example of FIG. 16, since it is possible to perform the determination in step S3 only using the detection signals of the phase difference detection pixels 52A and 52B, it is possible to achieve the same effects as in the modification example of FIG. 9.

In the above description, the phase difference AF processing unit 19 determines whether a high frequency component is included in a subject image according to a magnitude relationship between |M1−M2| and the threshold value TH3. As its modification example, the ratio of M1 and M2 may be calculated as a result of comparison of C1[d] and C2[d], and the determination may be performed according to a magnitude relationship between the ratio and the threshold value TH4.

For example, when M1 among M1 and M2 has a larger value, in step S54 of FIG. 16, if (M1/M2) is equal to or larger than the threshold value TH4, the process of step S55 may be performed, and if (M1/M2) is smaller than the threshold value TH4, the process of step S56 may be performed.

Figure 17:
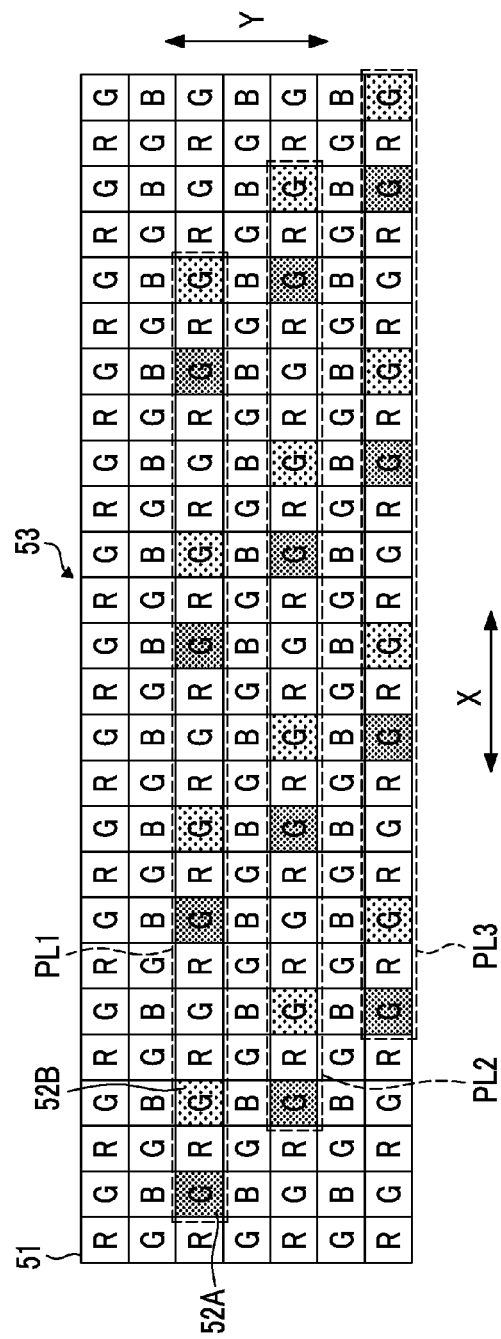
FIG. 17 is a diagram illustrating a first modification example of a block of the imaging element 5.

FIG. 17 is a diagram illustrating a first modification example of a configuration of a block included in an AF area 53 of the imaging element 5.

The configuration of FIG. 17 is different from the configuration of FIG. 3 in that a pair of the phase difference detection pixel 52A and the phase difference detection pixel 52B that form each of the pair lines PL1, PL2, and PL3 includes two G pixels 51 which are closest to each other in the row direction X.

In the configuration of FIG. 17, four phase difference detection pixels 52A that form each of the pair lines PL1, PL2, and PL3 are arranged in the row direction X at a first pitch (distance corresponding to six pixels in the example of FIG. 17), and forms a first signal detection unit group.

Four phase difference detection pixels 52B that form each of the pair lines PL1, PL2, and PL3 are arranged in the row direction X at a first pitch (distance corresponding to six pixels in the example of FIG. 17), and forms a second signal detection unit group.

In this way, in each block of the AF area 53, plural sets of (three sets in the example of FIG. 17) first signal detection unit groups and second signal detection unit groups are respectively arranged in the column direction Y.

The pair line PL2 is arranged to be shifted rightward by two pixels in the row direction X with respect to the pair line PL1. The pair line PL3 is arranged to be shifted rightward by two pixels in the row direction X with respect to the pair line PL2.

As a result, four phase difference detection pixels 52A in the pair line PL1, four phase difference detection pixels 52A in the pair line PL2, and four phase difference detection pixels 52A in the pair line PL3 are all arranged at different positions in the row direction X. Similarly, four phase difference detection pixels 52B in the pair line PL1, four phase difference detection pixels 52B in the pair line PL2, and four phase difference detection pixels 52B in the pair line PL3 are all arranged at different positions in the row direction X.

Further, an arrangement pitch of the phase difference detection pixels 52A in a state where four phase difference detection pixels 52A in the pair line PL1, four phase difference detection pixels 52A in the pair line PL2, and four phase difference detection pixels 52A in the pair line PL3 are arranged in the order of positions in the row direction X is set as a second pitch (distance corresponding to two pixels in the example of FIG. 17) shorter than the first pitch.

Similarly, an arrangement pitch of the phase difference detection pixels 52B in a state where four phase difference detection pixels 52B in the pair line PL1, four phase difference detection pixels 52B in the pair line PL2, and four phase difference detection pixels 52B in the pair line PL3 are arranged in the order of positions in the row direction X is set as a second pitch (distance corresponding to two pixels in the example of FIG. 17) shorter than the first pitch.

Even when an imaging element having the blocks shown in FIG. 17 is used in place of the imaging element 5 shown in FIG. 1, the phase difference AF processing unit 19 can perform the first generation process and the second generation process.

Then, in each pair line, odd-numbered phase difference detection pixels 52A from the left end are represented as a third signal detection group. Odd-numbered phase difference detection pixels 52B from the left end are represented as a fourth signal detection group. Even-numbered phase difference detection pixels 52A from the left end are represented as a fifth signal detection group. Even-numbered phase difference detection pixels 52B from the left end are represented as a sixth signal detection group.

With such a configuration, it is possible to apply the method for determining the presence or absence of a high frequency component, described in FIGS. 9 and 12.

Figure 18:
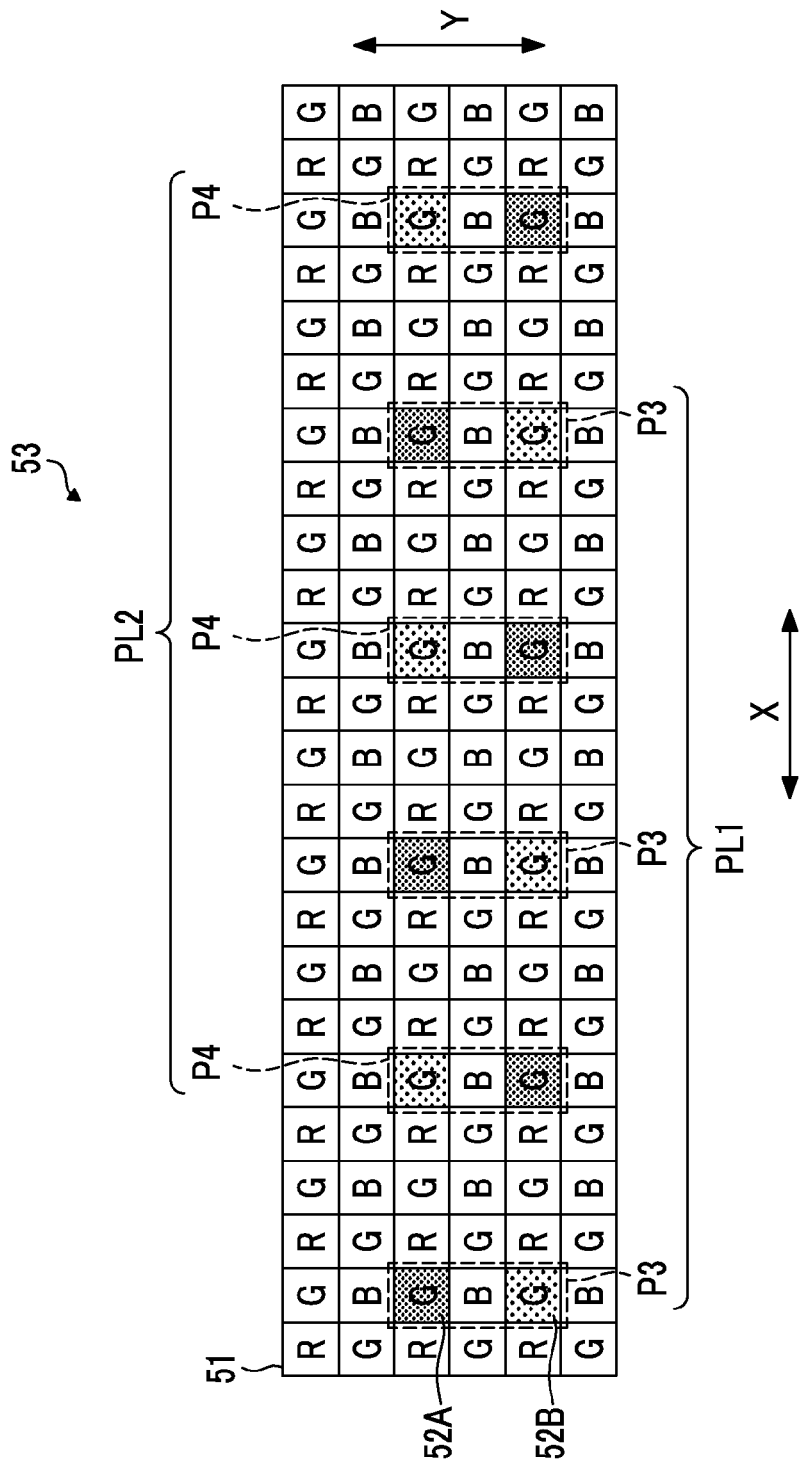
FIG. 18 is a diagram illustrating a second modification example of a block of the imaging element 5.

FIG. 18 is a diagram illustrating a second modification example of a configuration of a block included in the AF area 53 of the imaging element 5.

In the block shown in FIG. 18, pairs P3 formed by phase difference detection pixels 52A and phase difference detection pixels 52B arranged on a down side of the phase difference detection pixels 52A in the column direction Y, and pairs P4 in which positions of the phase difference detection pixels 52A and the positions of the phase difference detection pixels 52B of the pairs P3 are reversed are alternately arranged in the row direction X. In FIG. 18, a pair line PL1 is formed by the plural pairs P3, and a pair line PL2 is formed by the plural pairs P4.

In the configuration of FIG. 18, three phase difference detection pixels 52A that form each of the pair lines PL1 and PL2 are arranged in the row direction X at a first pitch (distance corresponding to eight pixels), and form a first signal detection unit group.

Three phase difference detection pixels 52B that form each of the pair lines PL1 and PL2 are arranged in the row direction X at the first pitch (distance corresponding to eight pixels), and form a second signal detection unit group.

In this way, as the block shown in FIG. 18, two first signal detection unit group and two second signal detection unit group are arranged in the column direction Y, respectively.

The pair line PL2 is disposed to be shifted rightward by four pixels in the row direction X with respect to the pair line PL1.

As a result, three phase difference detection pixels 52A in the pair line PL1 and three phase difference detection pixels 52A in the pair line PL2 are all arranged at different positions in the row direction X. Similarly, three phase difference detection pixels 52B in the pair line PL1 and three phase difference detection pixels 52B in the pair line PL2 are all arranged at different positions in the row direction X.

Further, an arrangement pitch of the phase difference detection pixels 52A in a state where three phase difference detection pixels 52A in the pair line PL1 and three phase difference detection pixels 52A in the pair line PL2 are arranged in the order of positions in the row direction X is set as a second pitch (distance corresponding to four pixels) shorter than the first pitch.

Similarly, an arrangement pitch of the phase difference detection pixels 52B in a state where three phase difference detection pixels 52B in the pair line PL1 and three phase difference detection pixels 52B in the pair line PL2 are arranged in the order of positions in the row direction X is set as a second pitch (distance corresponding to four pixels) shorter than the first pitch.

Even when an imaging element having the block shown in FIG. 18 is used in place of the imaging element 5 shown in FIG. 1, the phase difference AF processing unit 19 can perform the first generation process and the second generation process.

Then, the phase difference detection pixels 52A in the pair line PL1 are represented as a third signal detection group. The phase difference detection pixels 52B in the pair line PL1 are represented as a fourth signal detection group. The phase difference detection pixels 52A in the pair line PL2 are represented as a fifth signal detection group. The phase difference detection pixels 52B in the pair line PL2 are represented as a sixth signal detection group.

With such a configuration, it is possible to apply the method for determining the presence or absence of a high frequency component, described in FIGS. 9 and 12.

In this embodiment, an example in which the digital camera is used as the imaging device is shown, but hereinafter, an embodiment in which a smart phone with a camera is used as the imaging device will be described.

Figure 19:
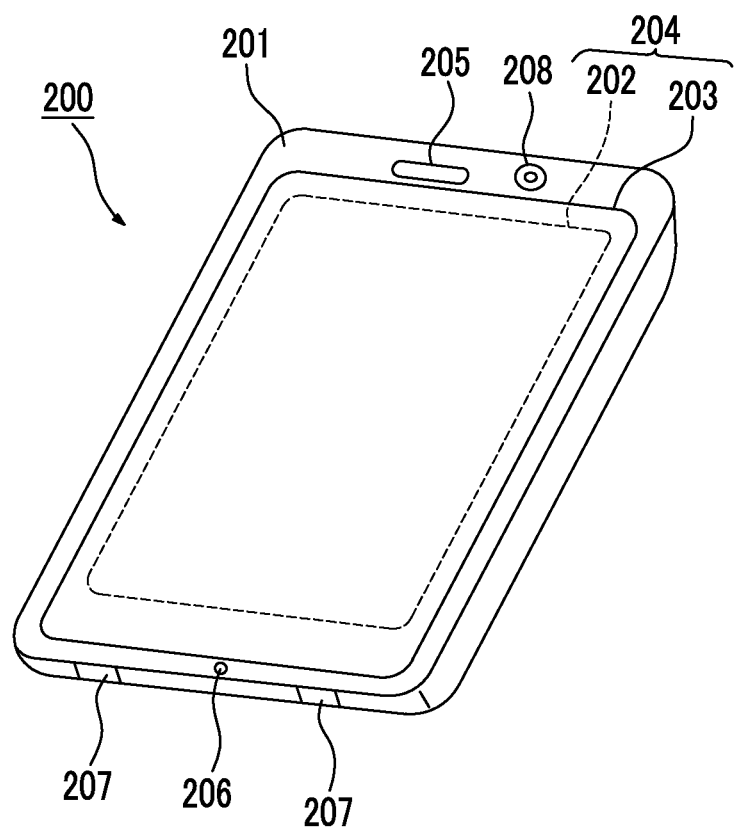
FIG. 19 is a diagram illustrating a smart phone which is an imaging device.

FIG. 19 is a diagram showing an appearance of a smart phone 200 which is an embodiment of the imaging device of the invention. The smart phone 200 shown in FIG. 19 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 20:
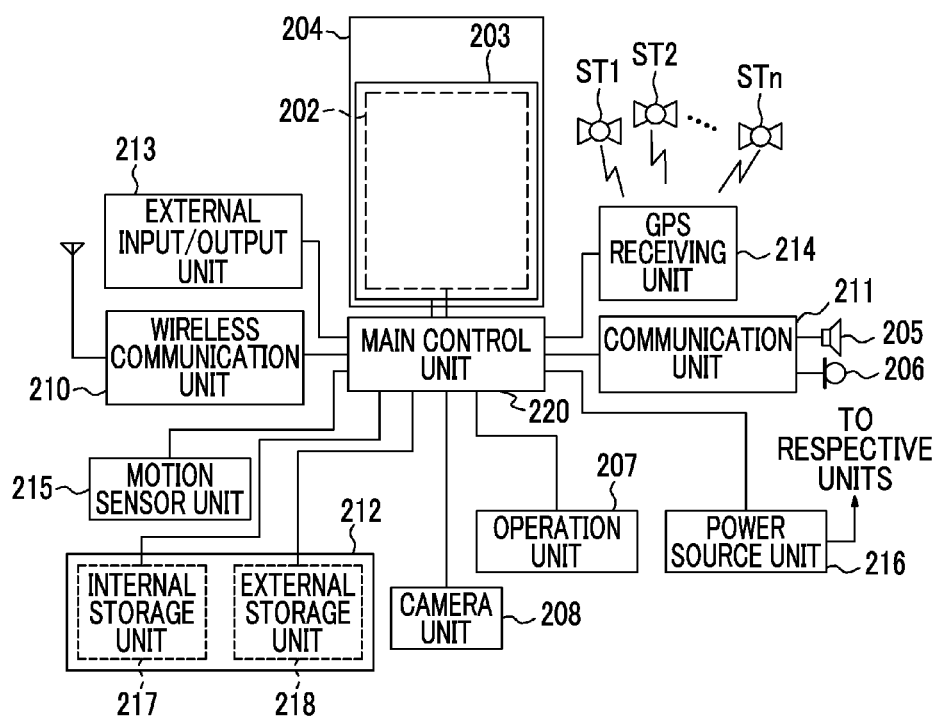
FIG. 20 is an internal block diagram illustrating the smart phone shown in FIG. 19.

FIG. 20 is a block diagram illustrating the configuration of the smart phone 200 shown in FIG. 19. As shown in FIG. 20, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source unit 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a still image and a video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OELD), or the like as a display device.

The operation panel 203 is a device that is mounted so that an image displayed on a display surface of the display panel 202 can be visually recognized and detects one or plural coordinates operated by a user's finger or a stylus. In the case that the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 19, the display panel 202 and the operation panel 203 of the smart phone 200 shown as an example of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an electromagnetic induction type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 19, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 19, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable and attachably memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As an external device to be connected to the smart phone 200, for example, a wired or wireless headset, a wired or wireless external charger, a wired or wireless data port, a memory card, a subscriber identity module (SIM) or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, both a personal computer and a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source unit 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a still image or a video image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Furthermore, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

The main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 19, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a still image or a video image, and the result may be recorded in the storage unit 212, or may be output through the input/output unit 213 or the wireless communication unit 210.

In the smart phone 200 with the above-described configuration, similarly, by using the imaging element 5 as the imaging element of the camera unit 208, and by performing the processes shown in FIG. 8 in the main control unit 220, it is possible perform a focusing control with high accuracy even when a subject is dark regardless of subjects.

As described above, this specification discloses the following content.

According to the disclosure, an imaging device includes: an imaging element that includes an imaging surface where a plurality of signal detection units arranged in two dimensions in a row direction and a column direction that is orthogonal to the row direction, the plurality of signal detection units including a first signal detection unit that detects a signal corresponding to a beam that passes through one divided region among divided regions of a pupil region of an imaging optical system divided in the row direction, a second signal detection unit that detects a signal corresponding to a beam that passes through the other divided region, and a third signal detection unit that detects a signal corresponding to beams that pass through the two divided regions, in which an area which is a focusing target on the imaging surface includes a block where a plurality of first signal detection unit groups including the plurality of first signal detection units arranged at a first pitch in the row direction and a plurality of second signal detection unit groups including the plurality of second signal detection units arranged at the first pitch in the row direction are respectively arranged in the column direction, in which positions of the respective first signal detection units that form the plurality of first signal detection unit groups in the row direction are different from each other, and positions of the respective second signal detection units that form the plurality of second signal detection unit groups in the row direction are different from each other, in which an arrangement pitch of the first signal detection units in a state where the respective first signal detection units that form the plurality of first signal detection unit groups are arranged in the order of positions in the row direction is a second pitch which is smaller than the first pitch, and in which an arrangement pitch of the second signal detection units in a state where the respective second signal detection units that form the plurality of second signal detection unit groups are arranged in the order of positions in the row direction is the second pitch. The imaging device further includes: a frequency determination unit that determines whether a subject image formed in the area includes a frequency component that is equal to or larger than a first threshold value; a defocus amount generation unit that performs a first generation process of generating a defocus amount based on a result of a correlation operation with respect to detection signals of the first signal detection unit group and detection signals of the second signal detection unit group in the block in a case where it is determined by the frequency determination unit that the subject image does not include the frequency component that is equal to or larger than the first threshold value, and performs a second generation process of generating a defocus amount based on a result of a correlation operation with respect to a detection signal group where detection signals of the first signal detection units that form the plurality of first signal detection unit groups are arranged in the order of positions in the row direction in the block and a detection signal group where detection signals of the second signal detection units that form the plurality of second signal detection unit groups are arranged in the order of positions in the row direction in the block in a case where it is determined by the frequency determination unit that the subject image includes the frequency component that is equal to or larger than the first threshold value; and a focusing control unit that performs a focusing control for the imaging optical system based on the defocus amount generated in the first generation process or the second generation process.

The disclosed imaging device may further includes: a focusing degree determination unit that determines the degree of focusing of a subject image formed in the area, and in a case where it is determined by the focusing degree determination unit that the degree of focusing is smaller than a second threshold value, the defocus amount generation unit may perform the first generation process regardless of a determination result of the frequency determination unit.

In the disclosed imaging device, the imaging device may have a still image capturing mode for recording still image data obtained by imaging using the imaging element and a video image capturing mode for recording video image data obtained by continuous imaging using the imaging element, and the defocus amount generation unit may perform any one of the first generation process and the second generation process in the still image capturing mode, and performs only the first generation process in the video image capturing mode.

In the disclosed imaging device, the frequency determination unit may generate a first matching degree which is a matching degree of two images captured by first pairs of a third signal detection unit group including the plurality of first signal detection units arranged in the row direction and a fourth signal detection unit group including the second signal detection units arranged at the same distance in one direction with respect to the respective first signal detection units of the third signal detection unit group in the block, using detection signals of the respective first and second signal detection units of the first pairs, may generate a second matching degree which is a matching degree of two images captured by second pairs of a fifth signal detection unit group including the plurality of first signal detection units arranged at the same distance in one direction with respect to the respective first signal detection units of the third signal detection unit group and arranged in the row direction and a sixth signal detection unit group including the second signal detection units arranged at the same distance in one direction with respect to the respective first signal detection units of the fifth signal detection unit group in the block, using detection signals of the respective first and second signal detection units of the second pairs, and may determine whether the subject image formed in the area includes the frequency component that is equal to or larger than the first threshold value based on a result of comparison between the first matching degree and the second matching degree.

In the disclosed imaging device, the frequency determination unit may generate a result of a correlation operation with respect to detection signal groups output from the respective third and fourth signal detection unit groups that form the first pairs as the first matching degree, and may generate a result of a correlation operation with respect to detection signal groups output from the respective fifth and sixth signal detection unit groups that form the second pairs as the second matching degree.

In the disclosed imaging device, the frequency determination unit may generate a ratio between an integrated value of detection signals of the first signal detection unit and an integrated value of detection signals of the second signal detection unit, the detection signals being output from the respective third and fourth signal detection unit groups that form the first pairs, as the first matching degree, and may generate a ratio between an integrated value of detection signals of the first signal detection unit and an integrated value of detection signals of the second signal detection unit, the detection signals being output from the respective fifth and sixth signal detection unit groups that form the second pairs, as the second matching degree.

In the disclosed imaging device, the frequency determination unit may perform a correlation operation with respect to detection signal groups in first pairs of a third signal detection unit group including the plurality of first signal detection units arranged in the row direction and a fourth signal detection unit group including the second signal detection units arranged at the same distance in one direction with respect to the respective first signal detection units of the third signal detection unit group in the block, may perform a correlation operation with respect to detection signal groups in second pairs of a fifth signal detection unit group including the plurality of first signal detection units arranged at the same distance in one direction with respect to the respective first signal detection units of the third signal detection unit group and arranged in the row direction and a sixth signal detection unit group including the second signal detection units arranged at the same distance in one direction with respect to the respective first signal detection units of the fifth signal detection unit group in the block, and may determine whether the subject image formed in the area includes the frequency component that is equal to or larger than the first threshold value based on a result of comparison of a first correlation value which is a minimum correlation value between the detection signal groups of the first pairs obtained from a result of the correlation operation with respect to the first pairs and a second correlation value which is a minimum correlation value between the detection signal groups of the second pairs obtained from a result of the correlation operation with respect to the second pairs.

In the disclosed imaging device, the frequency determination unit may determine whether the subject image formed in the area includes the frequency component that is equal to or larger than the first threshold value based on a difference or a ratio between the first correlation value and the second correlation value.

According to the disclosure, a focusing control method in an imaging device including an imaging element that includes an imaging surface where a plurality of signal detection units arranged in two dimensions in a row direction and a column direction that is orthogonal to the row direction, the plurality of signal detection units including a first signal detection unit that detects a signal corresponding to a beam that passes through one divided region among divided regions of a pupil region of an imaging optical system divided in the row direction, a second signal detection unit that detects a signal corresponding to a beam that passes through the other divided region, and a third signal detection unit that detects a signal corresponding to beams that pass through the two divided regions, in which an area which is a focusing target on the imaging surface includes a block where a plurality of first signal detection unit groups including the plurality of first signal detection units arranged at a first pitch in the row direction and a plurality of second signal detection unit groups including the plurality of second signal detection units arranged at the first pitch in the row direction are respectively arranged in the column direction, in which positions of the respective first signal detection units that form the plurality of first signal detection unit groups in the row direction are different from each other, and positions of the respective second signal detection units that form the plurality of second signal detection unit groups in the row direction are different from each other, in which an arrangement pitch of the first signal detection units in a state where the respective first signal detection units that form the plurality of first signal detection unit groups are arranged in the order of positions in the row direction is a second pitch which is smaller than the first pitch, and in which an arrangement pitch of the second signal detection units in a state where the respective second signal detection units that form the plurality of second signal detection unit groups are arranged in the order of positions in the row direction is the second pitch. The method includes: a frequency determination step of determining whether a subject image formed in the area includes a frequency component that is equal to or larger than a first threshold value; a defocus amount generation step of performing a first generation process of generating a defocus amount based on a result of a correlation operation with respect to detection signals of the first signal detection unit group and detection signals of the second signal detection unit group in the block in a case where it is determined in the frequency determination step that the subject image does not include the frequency component that is equal to or larger than the first threshold value, and performing a second generation process of generating a defocus amount based on a result of a correlation operation with respect to a detection signal group where detection signals of the first signal detection units that form the plurality of first signal detection unit groups are arranged in the order of positions in the row direction in the block and a detection signal group where detection signals of the second signal detection units that form the plurality of second signal detection unit groups are arranged in the order of positions in the row direction in the block in a case where it is determined in the frequency determination step that the subject image includes the frequency component that is equal to or larger than the first threshold value; and a focusing control step of performing a focusing control for the imaging optical system based on the defocus amount generated in the first generation process or the second generation process.

INDUSTRIAL APPLICABILITY

The invention is applied to a digital camera or the like to provide high convenience and effectiveness.

EXPLANATION OF REFERENCES

1: imaging lens
2: diaphragm
5: imaging element
11: system control unit (focusing control unit)
19: phase difference AF processing unit (defocus amount generation unit, frequency determination unit, focusing degree determination unit)
50: imaging surface
51: imaging pixel (third signal detection unit)
52A, 52B: phase difference detection pixel (first signal detection unit, second signal detection unit)
53: AF area (target area for focusing)

What is claimed is:
1. An imaging device comprising:
an imaging element that includes an imaging surface where a plurality of signal detection pixels are arranged in two dimensions in a row direction and a column direction that is orthogonal to the row direction, the plurality of signal detection pixels including a first signal detection pixel that detects a signal corresponding to a beam that passes through one divided region among divided regions of a pupil region of an imaging optical system divided in the row direction, a second signal detection pixel that detects a signal corresponding to a beam that passes through a second divided region, and a third signal detection pixel that detects a signal corresponding to beams that pass through the two divided regions,
wherein an area which is a focusing target on the imaging surface includes a block where a plurality of pair lines including a plurality of first signal detection pixel groups including the plurality of first signal detection pixels arranged at a first pitch in the row direction and a plurality of second signal detection pixel groups including the plurality of second signal detection pixels arranged at the first pitch in the row direction are arranged in the column direction,
wherein positions of the respective first signal detection pixels, arranged in an order of positions in the row direction viewed in a line, that form the plurality of first signal detection pixel groups in the row direction are different from each other, and positions of the respective second signal detection pixels, arranged in the order of positions in the row direction viewed in a line, that form the plurality of second signal detection pixel groups in the row direction are different from each other,
wherein an arrangement pitch of the first signal detection pixels in a state where the respective first signal detection pixels that form the plurality of first signal detection pixel groups are arranged in the order of positions in the row direction is a second pitch which is smaller than the first pitch,
wherein an arrangement pitch of the second signal detection pixels in a state where the respective second signal detection pixels that form the plurality of second signal detection pixel groups are arranged in the order of positions in the row direction is the second pitch, and
at least one processor configured to
determine whether a subject image formed in the area includes a frequency component that is equal to or larger than a first threshold value;
perform a first generation process of generating a defocus amount by calculating the defocus amount based on a result of a correlation operation with respect to detection signals of the first signal detection pixel group and detection signals of the second signal detection pixel group for each pair line in the area and by averaging the defocus amounts calculated for each pair line in a case where it is determined by the at least one processor that the subject image does not include the frequency component that is equal to or larger than the first threshold value, and performs a second generation process of generating a defocus amount by calculating the defocus amount based on a result of a correlation operation with respect to a detection signal group where detection signals of the first signal detection pixels that form the plurality of first signal detection pixel groups are arranged in the order of positions in the row direction for each block in the area and a detection signal group where detection signals of the second signal detection pixels that form the plurality of second signal detection pixel groups are arranged in the order of positions in the row direction in the block and by averaging the defocus amounts calculated for each block in a case where it is determined by the at least one processor that the subject image includes the frequency component that is equal to or larger than the first threshold value; and
perform a focusing control for the imaging optical system based on the defocus amount generated in the first generation process or the second generation process.

2. The imaging device according to claim 1, the at least one processor further configured to:
determine a degree of focusing of a subject image formed in the area,
wherein in a case where it is determined that the degree of focusing is smaller than a second threshold value, the at least one processor performs the first generation process regardless of a determination result of the frequency component.

3. The imaging device according to claim 1,
wherein the imaging device has a still image capturing mode for recording still image data obtained by imaging using the imaging element and a video image capturing mode for recording video image data obtained by continuous imaging using the imaging element, and
wherein the at least one processor performs any one of the first generation process and the second generation process in the still image capturing mode, and performs only the first generation process in the video image capturing mode.

4. The imaging device according to claim 2,
wherein the imaging device has a still image capturing mode for recording still image data obtained by imaging using the imaging element and a video image capturing mode for recording video image data obtained by continuous imaging using the imaging element, and
wherein the at least one processor performs any one of the first generation process and the second generation process in the still image capturing mode, and performs only the first generation process in the video image capturing mode.

5. The imaging device according to claim 1,
wherein the at least one processor generates a first matching degree which is a matching degree of two images captured by first pairs of a third signal detection pixel group including the plurality of first signal detection pixels arranged in the row direction and a fourth signal detection pixel group including the second signal detection pixels arranged at the same distance in one direction with respect to the respective first signal detection pixels of the third signal detection pixel group in the block, using detection signals of the respective first and second signal detection pixels of the first pairs, generates a second matching degree which is a matching degree of two images captured by second pairs of a fifth signal detection pixel group including the plurality of first signal detection pixels arranged at the same distance in one direction with respect to the respective first signal detection pixels of the third signal detection pixel group and arranged in the row direction and a sixth signal detection pixel group including the second signal detection pixels arranged at the same distance in one direction with respect to the respective first signal detection pixels of the fifth signal detection pixel group in the block, using detection signals of the respective first and second signal detection pixels of the second pairs, and determines whether the subject image formed in the area includes the frequency component that is equal to or larger than the first threshold value based on a result of comparison between the first matching degree and the second matching degree.

6. The imaging device according to claim 2,
wherein the at least one processor generates a first matching degree which is a matching degree of two images captured by first pairs of a third signal detection pixel group including the plurality of first signal detection pixels arranged in the row direction and a fourth signal detection pixel group including the second signal detection pixels arranged at the same distance in one direction with respect to the respective first signal detection pixels of the third signal detection pixel group in the block, using detection signals of the respective first and second signal detection pixels of the first pairs, generates a second matching degree which is a matching degree of two images captured by second pairs of a fifth signal detection pixel group including the plurality of first signal detection pixels arranged at the same distance in one direction with respect to the respective first signal detection pixels of the third signal detection pixel group and arranged in the row direction and a sixth signal detection pixel group including the second signal detection pixels arranged at the same distance in one direction with respect to the respective first signal detection pixels of the fifth signal detection pixel group in the block, using detection signals of the respective first and second signal detection pixels of the second pairs, and determines whether the subject image formed in the area includes the frequency component that is equal to or larger than the first threshold value based on a result of comparison between the first matching degree and the second matching degree.

7. The imaging device according to claim 3,
wherein the at least one processor generates a first matching degree which is a matching degree of two images captured by first pairs of a third signal detection pixel group including the plurality of first signal detection pixels arranged in the row direction and a fourth signal detection pixel group including the second signal detection pixels arranged at the same distance in one direction with respect to the respective first signal detection pixels of the third signal detection pixel group in the block, using detection signals of the respective first and second signal detection pixels of the first pairs, generates a second matching degree which is a matching degree of two images captured by second pairs of a fifth signal detection pixel group including the plurality of first signal detection pixels arranged at the same distance in one direction with respect to the respective first signal detection pixels of the third signal detection pixel group and arranged in the row direction and a sixth signal detection pixel group including the second signal detection pixels arranged at the same distance in one direction with respect to the respective first signal detection pixels of the fifth signal detection pixel group in the block, using detection signals of the respective first and second signal detection pixels of the second pairs, and determines whether the subject image formed in the area includes the frequency component that is equal to or larger than the first threshold value based on a result of comparison between the first matching degree and the second matching degree.

8. The imaging device according to claim 4,
wherein the at least one processor generates a first matching degree which is a matching degree of two images captured by first pairs of a third signal detection pixel group including the plurality of first signal detection pixels arranged in the row direction and a fourth signal detection pixel group including the second signal detection pixels arranged at the same distance in one direction with respect to the respective first signal detection pixels of the third signal detection pixel group in the block, using detection signals of the respective first and second signal detection pixels of the first pairs, generates a second matching degree which is a matching degree of two images captured by second pairs of a fifth signal detection pixel group including the plurality of first signal detection pixels arranged at the same distance in one direction with respect to the respective first signal detection pixels of the third signal detection pixel group and arranged in the row direction and a sixth signal detection pixel group including the second signal detection pixels arranged at the same distance in one direction with respect to the respective first signal detection pixels of the fifth signal detection pixel group in the block, using detection signals of the respective first and second signal detection pixels of the second pairs, and determines whether the subject image formed in the area includes the frequency component that is equal to or larger than the first threshold value based on a result of comparison between the first matching degree and the second matching degree.

9. The imaging device according to claim 5,
wherein the at least one processor generates a result of a correlation operation with respect to detection signal groups output from the respective third and fourth signal detection pixel groups that form the first pairs as the first matching degree, and generates a result of a correlation operation with respect to detection signal groups output from the respective fifth and sixth signal detection pixel groups that form the second pairs as the second matching degree.

10. The imaging device according to claim 6,
wherein the at least one processor generates a result of a correlation operation with respect to detection signal groups output from the respective third and fourth signal detection pixel groups that form the first pairs as the first matching degree, and generates a result of a correlation operation with respect to detection signal groups output from the respective fifth and sixth signal detection pixel groups that form the second pairs as the second matching degree.

11. The imaging device according to claim 7,
wherein the at least one processor generates a result of a correlation operation with respect to detection signal groups output from the respective third and fourth signal detection pixel groups that form the first pairs as the first matching degree, and generates a result of a correlation operation with respect to detection signal groups output from the respective fifth and sixth signal detection pixel groups that form the second pairs as the second matching degree.

12. The imaging device according to claim 8,
wherein the at least one processor generates a result of a correlation operation with respect to detection signal groups output from the respective third and fourth signal detection pixel groups that form the first pairs as the first matching degree, and generates a result of a correlation operation with respect to detection signal groups output from the respective fifth and sixth signal detection pixel groups that form the second pairs as the second matching degree.

13. The imaging device according to claim 5,
wherein the at least one processor generates a ratio between an integrated value of detection signals of the first signal detection pixel and an integrated value of detection signals of the second signal detection pixel, the detection signals being output from the respective third and fourth signal detection pixel groups that form the first pairs, as the first matching degree, and generates a ratio between an integrated value of detection signals of the first signal detection pixel and an integrated value of detection signals of the second signal detection pixel, the detection signals being output from the respective fifth and sixth signal detection pixel groups that form the second pairs, as the second matching degree.

14. The imaging device according to claim 6,
wherein the at least one processor generates a ratio between an integrated value of detection signals of the first signal detection pixel and an integrated value of detection signals of the second signal detection pixel, the detection signals being output from the respective third and fourth signal detection pixel groups that form the first pairs, as the first matching degree, and generates a ratio between an integrated value of detection signals of the first signal detection pixel and an integrated value of detection signals of the second signal detection pixel, the detection signals being output from the respective fifth and sixth signal detection pixel groups that form the second pairs, as the second matching degree.

15. The imaging device according to claim 7,
wherein the at least one processor generates a ratio between an integrated value of detection signals of the first signal detection pixel and an integrated value of detection signals of the second signal detection pixel, the detection signals being output from the respective third and fourth signal detection pixel groups that form the first pairs, as the first matching degree, and generates a ratio between an integrated value of detection signals of the first signal detection pixel and an integrated value of detection signals of the second signal detection pixel, the detection signals being output from the respective fifth and sixth signal detection pixel groups that form the second pairs, as the second matching degree.

16. The imaging device according to claim 8,
wherein the at least one processor generates a ratio between an integrated value of detection signals of the first signal detection pixel and an integrated value of detection signals of the second signal detection pixel, the detection signals being output from the respective third and fourth signal detection pixel groups that form the first pairs, as the first matching degree, and generates a ratio between an integrated value of detection signals of the first signal detection pixel and an integrated value of detection signals of the second signal detection pixel, the detection signals being output from the respective fifth and sixth signal detection pixel groups that form the second pairs, as the second matching degree.

17. The imaging device according to claim 1,
wherein the at least one processor performs a correlation operation with respect to detection signal groups in first pairs of a third signal detection pixel group including the plurality of first signal detection pixels arranged in the row direction and a fourth signal detection pixel group including the second signal detection pixels arranged at the same distance in one direction with respect to the respective first signal detection pixels of the third signal detection pixel group in the block, performs a correlation operation with respect to detection signal groups in second pairs of a fifth signal detection pixel group including the plurality of first signal detection pixels arranged at the same distance in one direction with respect to the respective first signal detection pixels of the third signal detection pixel group and arranged in the row direction and a sixth signal detection pixel group including the second signal detection pixels arranged at the same distance in one direction with respect to the respective first signal detection pixels of the fifth signal detection pixel group in the block, and determines whether the subject image formed in the area includes the frequency component that is equal to or larger than the first threshold value based on a result of comparison of a first correlation value which is a minimum correlation value between the detection signal groups of the first pairs obtained from a result of the correlation operation with respect to the first pairs and a second correlation value which is a minimum correlation value between the detection signal groups of the second pairs obtained from a result of the correlation operation with respect to the second pairs.

18. The imaging device according to claim 17, wherein the at least one processor determines whether the subject image formed in the area includes the frequency component that is equal to or larger than the first threshold value based on a difference or a ratio between the first correlation value and the second correlation value.

19. An imaging device comprising:
an imaging element that includes an imaging surface where a plurality of signal detection pixels are arranged in two dimensions in a row direction and a column direction that is orthogonal to the row direction, the plurality of signal detection pixels including a first signal detection pixel that detects a signal corresponding to a beam that passes through one divided region among divided regions of a pupil region of an imaging optical system divided in the row direction, a second signal detection pixel that detects a signal corresponding to a beam that passes through a second divided region, and a third signal detection pixel that detects a signal corresponding to beams that pass through the two divided regions,
wherein an area which is a focusing target on the imaging surface includes a block where a plurality of pair lines including a plurality of first signal detection pixel groups including the plurality of first signal detection pixels arranged at a first pitch in the row direction and a plurality of second signal detection pixel groups including the plurality of second signal detection pixels arranged at the first pitch in the row direction are arranged in the column direction,
wherein positions of the respective first signal detection pixels, arranged in an order of positions in the row direction viewed in a line, in the plurality of first signal detection pixel groups in the row direction are different from each other, and positions of the respective second signal detection pixels, arranged in the order of positions in the row direction viewed in a line, in the plurality of second signal detection pixel groups in the row direction are different from each other,
wherein an arrangement pitch of the first signal detection pixels in a state where the respective first signal detection pixels in the plurality of first signal detection pixel groups are arranged in the order of positions in the row direction is a second pitch which is smaller than the first pitch,
wherein an arrangement pitch of the second signal detection pixels in a state where the respective second signal detection pixels that form the plurality of second signal detection pixel groups are arranged in the order of positions in the row direction is the second pitch, and
at least one processor configured to
determines whether a subject image formed in the area includes a frequency component that is equal to or larger than a first threshold value;
performs a first generation process of generating a defocus amount by calculating the defocus amount based on a result of a correlation operation with respect to detection signals of the first signal detection pixel group and detection signals of the second signal detection pixel group for each pair line in the area and by averaging the defocus amounts calculated for each pair line in a case where it is determined by the at least one processor that the subject image does not include the frequency component that is equal to or larger than the first threshold value, and performs a second generation process of generating a defocus amount by calculating the defocus amount based on a result of a correlation operation with respect to a detection signal group where detection signals of the first signal detection pixels that form the plurality of first signal detection pixel groups are arranged in the order of positions in the row direction for each block in the area and a detection signal group where detection signals of the second signal detection pixels that form the plurality of second signal detection pixel groups are arranged in the order of positions in the row direction in the block and by averaging the defocus amounts calculated for each block in a case where it is determined by the at least one processor that the subject image includes the frequency component that is equal to or larger than the first threshold value; and
performs a focusing control for the imaging optical system based on the defocus amount generated in the first generation process or the second generation process.

20. A focusing control method in an imaging device including an imaging element that includes an imaging surface where a plurality of signal detection pixels are arranged in two dimensions in a row direction and a column direction that is orthogonal to the row direction, the plurality of signal detection pixels including a first signal detection pixel that detects a signal corresponding to a beam that passes through one divided region among divided regions of a pupil region of an imaging optical system divided in the row direction, a second signal detection pixel that detects a signal corresponding to a beam that passes through a second divided region, and a third signal detection pixel that detects a signal corresponding to beams that pass through the two divided regions,
wherein an area which is a focusing target on the imaging surface includes a block where a plurality of pair lines including a plurality of first signal detection pixel groups including the plurality of first signal detection pixels arranged at a first pitch in the row direction and a plurality of second signal detection pixel groups including the plurality of second signal detection pixels arranged at the first pitch in the row direction are arranged in the column direction, wherein positions of the respective first signal detection pixels, arranged in an order of positions in the row direction viewed in a line, that form the plurality of first signal detection pixel groups in the row direction are different from each other, and positions of the respective second signal detection pixels, arranged in the order of positions in the row direction viewed in a line, that form the plurality of second signal detection pixel groups in the row direction are different from each other, wherein an arrangement pitch of the first signal detection pixels in a state where the respective first signal detection pixels that form the plurality of first signal detection pixel groups are arranged in the order of positions in the row direction is a second pitch which is smaller than the first pitch, and wherein an arrangement pitch of the second signal detection pixels in a state where the respective second signal detection pixels that form the plurality of second signal detection pixel groups are arranged in the order of positions in the row direction is the second pitch, the method comprising:

a frequency determination step of determining whether a subject image formed in the area includes a frequency component that is equal to or larger than a first threshold value;

a defocus amount generation step of performing a first generation process of generating a defocus amount by calculating the defocus amount based on a result of a correlation operation with respect to detection signals of the first signal detection pixel group and detection signals of the second signal detection pixel group for each pair line in the area and by averaging the defocus amounts calculated for each pair line in a case where it is determined in the frequency determination step that the subject image does not include the frequency component that is equal to or larger than the first threshold value, and performing a second generation process of generating a defocus amount by calculating the defocus amount based on a result of a correlation operation with respect to a detection signal group where detection signals of the first signal detection pixels that form the plurality of first signal detection pixel groups are arranged in the order of positions in the row direction for each block in the area and a detection signal group where detection signals of the second signal detection pixels that form the plurality of second signal detection pixel groups are arranged in the order of positions in the row direction in the block and by averaging the defocus amounts calculated for each block in a case where it is determined in the frequency determination step that the subject image includes the frequency component that is equal to or larger than the first threshold value; and a focusing control step of performing a focusing control for the imaging optical system based on the defocus amount generated in the first generation process or the second generation process.

* * * * *